United States Patent
Ueda et al.

(10) Patent No.: US 9,504,020 B2
(45) Date of Patent: Nov. 22, 2016

(54) METHOD FOR EXCHANGING INFORMATION BETWEEN COMMUNICATION TERMINALS, AND COMMUNICATION TERMINAL

(71) Applicant: NEC Corporation, Tokyo (JP)

(72) Inventors: Hirofumi Ueda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/434,029

(22) PCT Filed: Jun. 13, 2013

(86) PCT No.: PCT/JP2013/003721
§ 371 (c)(1),
(2) Date: Apr. 7, 2015

(87) PCT Pub. No.: WO2014/057595
PCT Pub. Date: Apr. 17, 2014

(65) Prior Publication Data
US 2015/0257142 A1 Sep. 10, 2015

(30) Foreign Application Priority Data

Oct. 9, 2012 (JP) .................................. 2012-224131

(51) Int. Cl.
*H04W 72/04* (2009.01)
*H04W 40/24* (2009.01)
(Continued)

(52) U.S. Cl.
CPC ......... *H04W 72/0406* (2013.01); *H04W 40/24* (2013.01); *H04W 48/10* (2013.01); *H04W 76/025* (2013.01); *H04W 84/18* (2013.01)

(58) Field of Classification Search
CPC .......................... H04W 72/0406; H04W 4/005
(Continued)

(56) References Cited

U.S. PATENT DOCUMENTS 5,412,654 A * 5/1995 Perkins .................. H04L 45/02
370/312
7,082,117 B2 * 7/2006 Billhartz .................. H04L 1/00
370/338
(Continued)

FOREIGN PATENT DOCUMENTS

| JP | 2007-036397 | 2/2007 |
| JP | 2007-116230 | 5/2007 |
| WO | WO 2009/078427 | 6/2009 |

OTHER PUBLICATIONS

International Search Report, PCT/JP2013/003721, Jul. 16, 2013.
Extented European Search—EP 13 84 4998—Jun. 8, 2016.

*Primary Examiner* — Andrew Lai
*Assistant Examiner* — Andrew C Lee
(74) *Attorney, Agent, or Firm* — Young & Thompson

(57) ABSTRACT

Upon sensing an update of any routing information entry held in a routing information storage unit (A104), an information exchange coordination unit (A105) references a node information storage unit (A102), and if a node information entry corresponding to the updated routing information entry does not exist, acquires the corresponding node information entry from another communication terminal (A1b). Alternatively, upon sensing an update of any node information entry held in the node information storage unit (A102), the information exchange coordination unit (A105) references the routing information storage unit (A104), and if a routing information entry corresponding to the updated node information entry does not exist, acquires the corresponding routing information entry from another communication terminal (A1b). This provides a communication terminal for (Continued)

acquiring both the node information entry and the routing information entry relating to a specific communication terminal substantially at the same time.

20 Claims, 11 Drawing Sheets

(51) Int. Cl.
H04W 48/10 (2009.01)
H04W 76/02 (2009.01)
H04W 84/18 (2009.01)

(58) Field of Classification Search
USPC .............. 370/329, 310, 315, 328, 338, 392
See application file for complete search history.

(56) References Cited

U.S. PATENT DOCUMENTS

| | | | |
|---|---|---|---|
| 2001/0033556 A1* | 10/2001 | Krishnamurthy | H04L 45/02 370/329 |
| 2002/0080752 A1* | 6/2002 | Johansson | H04L 29/06 370/338 |
| 2003/0046413 A1* | 3/2003 | Sakakura | H04W 40/02 709/229 |
| 2004/0147223 A1* | 7/2004 | Cho | H04L 12/66 455/41.2 |
| 2004/0190477 A1* | 9/2004 | Olson | H04W 84/12 370/338 |
| 2006/0262762 A1* | 11/2006 | Cho | H04W 48/08 370/338 |
| 2007/0230390 A1* | 10/2007 | Takatani | H04J 3/1617 370/315 |
| 2007/0297393 A1* | 12/2007 | Furukawa | H04L 12/66 370/352 |
| 2008/0069105 A1* | 3/2008 | Costa | H04L 63/0853 370/392 |
| 2009/0010199 A1* | 1/2009 | Adachi | H04W 40/02 370/315 |
| 2009/0109901 A1* | 4/2009 | Kondo | H04L 45/125 370/328 |
| 2010/0142421 A1* | 6/2010 | Schlicht | H04W 4/20 370/310 |
| 2010/0265951 A1 | 10/2010 | Fujita et al. | |
| 2010/0265955 A1 | 10/2010 | Park et al. | |
| 2011/0004913 A1* | 1/2011 | Nagarajan | H04L 63/102 726/1 |

* cited by examiner

Fig.3A

| Node ID | Node IP | EXPIRATION DATE AND TIME |
|---|---|---|
| Node1 | 191.168.0.1 | 2012/08/29 13:00:00 |
| Node2 | 191.168.0.2 | 2012/08/29 12:50:00 |
| Node3 | 191.168.0.3 | 2012/08/29 12:50:00 |
| ⋮ | ⋮ | ⋮ |

| Node ID | Routing Address | EXPIRATION DATE AND TIME |
|---|---|---|
| Node1 | Haddr1 | 2012/08/29 13:00:00 |
| Node2 | Haddr2 | 2012/08/29 12:50:00 |
| Node3 | Haddr3 | 2012/08/29 12:50:00 |
| ⋮ | ⋮ | ⋮ |

| Node ID | Node IP | Contents List | EXPIRATION DATE AND TIME |
|---|---|---|---|
| Node1 | 191.168.0.1 | List1 | 2012/08/29 13:00:00 |
| Node2 | 191.168.0.2 | List2 | 2012/08/29 12:50:00 |
| Node3 | 191.168.0.3 | List3 | 2012/08/29 12:50:00 |
| ⋮ | ⋮ | ⋮ | ⋮ |

| Dest . IP | Next hop IP | EXPIRATION DATE AND TIME |
|---|---|---|
| 191.168.0.1 | 191.168.0.5 | 2012/08/29 12:59:00 |
| 191.168.0.2 | 191.168.0.6 | 2012/08/29 12:49:00 |
| 191.168.0.3 | 191.168.0.7 | 2012/08/29 12:49:00 |
| ⋮ | ⋮ | ⋮ |

| Dest . IP | Next hop IP | RECEIPT TIME |
|---|---|---|
| 191.168.0.1 | 191.168.0.5 | 2012/08/29 13:00:00 |
| 191.168.0.2 | 191.168.0.6 | 2012/08/29 12:50:00 |
| 191.168.0.3 | 191.168.0.7 | 2012/08/29 12:50:00 |
| ⋮ | ⋮ | ⋮ |

| Dest . IP | Next hop IP | ROUTE SCORE |
|---|---|---|
| 191.168.0.1 | 191.168.0.5 | 0.9 |
| 191.168.0.2 | 191.168.0.6 | 0.8 |
| 191.168.0.3 | 191.168.0.7 | 0.8 |
| ⋮ | ⋮ | |

R130, 61, 62, 63

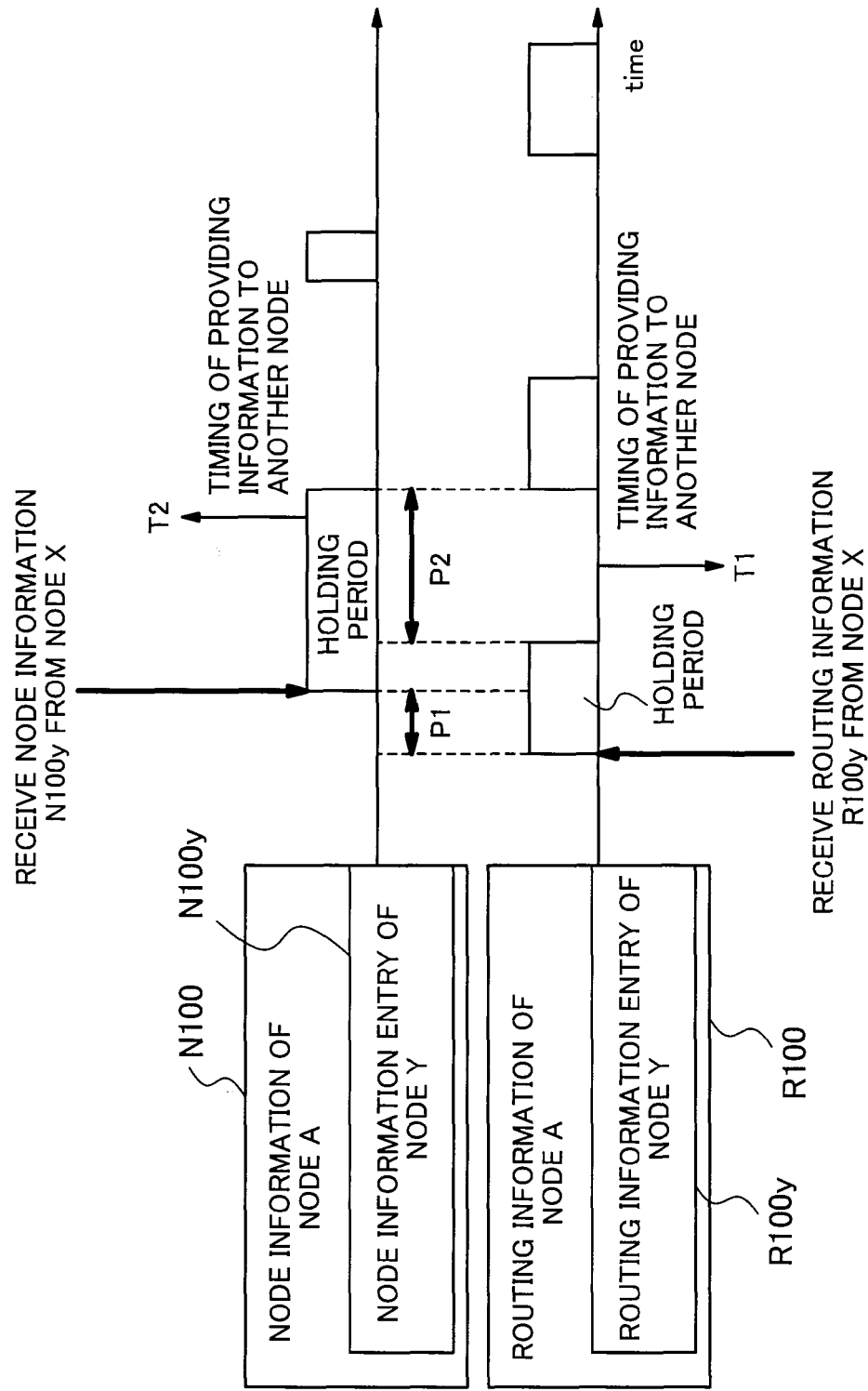

METHOD FOR EXCHANGING INFORMATION BETWEEN COMMUNICATION TERMINALS, AND COMMUNICATION TERMINAL

TECHNICAL FIELD

The present invention relates to a method for exchanging information between communication terminals and a communication terminal and, in particular, to a method for exchanging information such as node information and routing information between communication terminals on the basis of whether or not mutually corresponding node information and routing information entries exist, and such communication terminal.

BACKGROUND ART

As communication means in remote areas where network infrastructures are unavailable or at the time of disaster, autonomous distributed (self-configuring) mobile ad-hoc networks (MANET) have come to attention in recent years, in which data is forwarded from one communication terminal to another by wireless communication, and implementation of information sharing in a large-scale environment in which a wide range of many communication terminals (nodes) participate, as well as network infrastructures, is desired.

In order to share information among a wide range of many communication terminals in a mobile ad-hoc network (MANET), especially the following two kinds of information need to be shared among communication terminals in the network:
(1) Node information (i.e. node IDs, node IP addresses, and information about contents held by nodes) and
(2) Routing information (i.e. next-hop (forwarding destination) node information for reaching a destination node, the probability of reaching the destination node, and the routing address of the destination node).

This is because the mobile ad-hoc network uses a mechanism in which each communication terminal identifies an "information sharing terminal" with which the communication terminal is to communicate by "(1) node information" and identifies a "communication (data transfer) route" to the aforementioned "information sharing terminal" by "(2) routing information".

Accordingly, each communication terminal (node) needs to be in a state where they manage "(1) node information" relating to each of other communication terminals in a network and "(2) routing information" in association with each other or hold both kinds of information.

On the other hand, the amount of information exchanged between communication terminals needs to be reduced because communication bandwidth available between communication terminals in a mobile ad-hoc network (MANET) is limited. In other words, since communication terminals in the mobile ad-hoc network (MANET) directly communicate with each other by wireless communication, interference occurs between radio waves from communication terminals that participate in the network, thus limiting available communication bandwidth. Furthermore, since communication radio waves can fail to reach communication terminals due to movement of the communication terminals or interruption of radio waves by obstacles, the communication link between communication terminals can often disconnected or network disruption can occur.

Consequently, communication bandwidth and time available to one communication terminal for communication with another communication terminal are limited.

In order to enable information sharing in a large-scale environment in mobile ad-hoc networks (MANET) under these circumstances or delay/disruption tolerant networks (DTN) which cope with a poor-quality communication environment in which the network can be disrupted, a method is used in which each communication terminal holds for some time node information and routing information relating to a correspondent communication terminal with which the communication terminal was once connected in order to enable "(1) node information" and "(2) routing information" to be exchange between many communication terminals.

For example, a communication terminal exchanges node information and routing information relating to every other communication terminal that the terminal has met or neighbored and stores the information for a certain period of time in methods for managing information in a delay/disruption tolerant network (DTN) described in NPL 1, "Probabilistic routing in intermittently connected networks" by Anders Lindgren et al. (ACM SIGMOBILE Mobile Computing and Communications Review, Volume 7, Issue 3, July 2003, Pages 19-20 and NPL 2, "ROUTING IN INTERMITTENTLY CONNECTED MOBILE AD-HOC NETWORKS AND DELAY TOLERANT NETWORKS: OVERVIEW AND CHALLENGES" by ZHENSHENG ZHANG et al. (IEEE Communications Surveys & Tutorials, 1ST QUARTER 2006, VOLUME 8, NO. 1, Pages 24-37). Storing node information and routing information as a history for a certain period of time in this way enables a communication terminal to identify a next communication terminal to which data is to be passed when a communication link is recovered or when the communication terminal meets another communication terminal.

However, the amount of information to be exchanged between communication terminals increases in proportion to the number of communication terminals participating in the network. Given these circumstances, in order for communication terminals (nodes) to share information with each other in a mobile ad-hoc network (MANET) in which a wide range of many communication terminals participate or a delay/disruption tolerant network (DTN), which is liable to network disruption, the amount of information exchanged between communication terminals (nodes) needs to be minimized to reduce load on communication bandwidth by cleverly managing and exchanging node information and routing information.

As described above, for information sharing in mobile ad-hoc networks (MANET) or delay/disruption tolerant networks (DTN), "(1) node information" and "(2) routing information" needs to be managed in association with each other or to be held, and the amount of exchanged information relating to both "(1) node information" and "(2) routing information" to be exchanged between communication terminals needs to be reduced.

However, existing network techniques, for example methods proposed in NPL 3, "Design Issues of Peer-to-Peer Systems for Wireless Ad Hoc Networks" by Dewan Tanvir Ahmed et al. (Networking, 2007. ICN '07. Sixth International Conference on Date of Conference, Pages 22-28, April 2007) and NPL 4, "Scalable routing protocols for mobile ad-hoc networks" by Xiaoyan Hong (Network, IEEE Date of Publication: July/August 2002, Volume: 16, Issue: 4, Pages 11-21) have not achieved a fundamental solution. In the methods, mechanisms for exchanging node information and routing information independently of each other are used and a network is layered and information is managed in a layered manner in order to reduce the amount of information exchanged.

Specifically, in the existing network techniques, since the function of exchanging node information and the function of exchanging routing information operate independently in different network layers and control focusing solely to one of the node information and routing information is performed, the node information and the routing information are not managed or held in pairs. Consequently, a lag between a period in which node information N100 is exchanged and a period in which routing information R100 is exchanged occurs with the other communication terminal (other node) as illustrated in FIG. 11. FIG. 11 is a diagram for illustrating the messaging timings of providing node information and routing information held by a communication terminal (node) and periods during which the communication terminal is holding the node information and routing information in an existing technique. FIG. 11 focuses on a node Y entry relating to node Y received from node X, i.e. a node information entry N100y, and a routing information entry R100y out of the node information N100 held by node A and the routing information R100 held by node A and illustrates a situation where there are differences in the messaging timing of providing information to another node and in period in which the received information is held.

Specifically, with regard to a node information entry N100y relating to node Y that is to be held by node A, for example, there is a period, depicted as node information non-holding period P1 in FIG. 11, between receipt of the routing information entry R100y from node X and receipt of the node information entry N100y from node X during which node A does not hold the node information entry N100y relating to node Y and the routing information entry R100y in pairs because of a difference between the periodicity of exchange of node information N100 and the periodicity of exchange of routing information R100.

Furthermore, because of a lag between a node information N100 holding period and a routing information R100 holding period, the holding period of the routing information entry R100y of node Y, for example, may expire and the routing information entry R100y may be deleted, which may result in a period during which node A holds only the node information entry N100y of node Y out of the two kinds of information relating to node Y that are to be held by node A, as depicted as a routing information non-holding period P2 in FIG. 11.

When node A provides information to the other node at messaging timing T1 and messaging timing T2 in FIG. 11, node A does not provide the routing information entry R100y relating to node Y and provides only the node information entry N100y relating to node Y. As a result, communication bandwidth and storage of the communication terminals are wasted.

CITATION LIST

Non Patent Literature

[NPL 1] Anders Lindgren, Avri Doria Lule, Olov Schelen: "Probabilistic routing in intermittently connected networks", ACM SIGMOBILE Mobile Computing and Communications Review, Volume 7, Issue 3, July 2003, Pages 19-20

[NPL 2] ZHENSHENG ZHANG, SAN DIEGO RESEARCH CENTER: "ROUTING IN INTERMITTENTLY CONNECTED MOBILE AD-HOC NETWORKS AND DELAY TOLERANT NETWORKS: OVERVIEW AND CHALLENGES", IEEE Communications Surveys & Tutorials, 1ST QUATER 2006, VOLUME 8, NO. 1, Pages 24-37

[NPL 3] Dewan Tanvir Ahmed, Shervin Shirmohammadi: "Design Issues of Peer-to-Peer Systems for Wireless Ad Hoc Networks", Networking, 2007. ICN '07. Sixth International Conference on Date of Conference, Pages 22-28, April 2007

[NPL 4] Xiaoyan Hong: "Scalable routing protocols for mobile ad-hoc networks", Network, IEEE Date of Publication: July/August 2002, Volume: 16, Issue: 4, Pages 11-21

SUMMARY OF INVENTION

Technical Problem

As described above, the existing network techniques cannot solve the following problems.

A first problem is that when a communication terminal meets another communication terminal, the communication terminal can possibly provide only one of the node information and routing information relating to a particular communication terminal. This is because the function of exchanging node information and the function of exchanging routing information operate independently of each other in different network layers and the timings of exchanging the two kinds of information are not synchronized. As a result, the node information and the routing information relating to the particular communication terminal cannot be provided to the other communication terminal in pairs and communication bandwidth and resources of the communication terminals are wasted.

A second problem is that a communication terminal can possibly keep holding only one of node information and routing information relating to a particular communication terminal. This is because the function of managing node information or the function of managing routing information is not capable of determining whether a routing information entry or a node information entry that corresponds to a node information entry or a routing information entry exists or not to identify information that does not need to be held. Consequently, node information and routing information for a particular communication terminal cannot be managed in pairs and communication bandwidth and resources of the communication terminals are wasted.

Specifically, in information sharing among communication terminals in mobile ad-hoc networks (MANET) and delay/disruption tolerant networks (DTN), communication terminals needs to be placed in a "state where both of node information and routing information are managed in association with each other or a state where both of the two kinds of information are held". However, because exchange of node information and exchange of routing information are controlled independently of each other, there are the following two problems:

(1) there is a difference between the periodicity of exchange of node information and the periodicity of exchange of routing information and therefore there is periods in which communication terminals do not hold the two kinds of information, node information and routing information, and (2) there is a lag between a node information holding period and a routing information holding period, which results in a period in which only one of the two kinds of information is held. Consequently, communication bandwidth and storages of the communication terminals are wasted.

Objects of Invention

The present invention has been made in light of these problems and a first object of the present invention is to provide a method for exchanging information between communication terminals and a communication terminal that include a mechanism for acquiring both of a node information entry and a routing information entry that relate to a particular communication terminal at substantially the same time.

A second object of the present invention is to provide a method for exchanging information between communication terminals and a communication terminal that include a mechanism for avoiding uselessly holding only one of a pair of a node information entry and a routing information entry that relate to a particular communication terminal.

Solution to Problem

To solve the problems described above, a method for exchanging information between communication terminals and a communication terminal according to the present invention primarily employ the following characteristic configurations.

(1) A first method for exchanging information between communication terminals according to the present invention is a method for exchanging node information and routing information between a plurality of communication terminals constituting a network, the node information being used for identifying each of the communication terminals, the routing information indicating a communication route to each of the communication terminals which is a destination; wherein when each of the plurality of communication terminals detects, in the routing information locally held by the communication terminal, update of a routing information entry relating to any of the communication terminals or detects, in the node information locally held by the communication terminal, update of a node information entry relating to any of the communication terminal, the communication terminal references, in the node information locally held by the communication terminal, a node information entry corresponding to the updated routing information entry or, references, in the routing information locally held by the communication terminal, a routing information entry corresponding to the updated node information entry; and if the corresponding node information entry or the corresponding routing information entry does not exist, acquires the corresponding node information entry or the corresponding routing information entry from another communication terminal.

(2) A second method for exchanging information between communication terminals according to the present invention is a method for exchanging node information and routing information between a plurality of communication terminals constituting a network, the node information being used for identifying each of the communication terminals, the routing information indicating a communication route to each of the communication terminals which is a destination; wherein when each of the plurality of communication terminals determines whether or not each of the routing information entries relating to the communication terminals that are included in the routing information locally held by the communication terminal or each of the node information entries relating to the communication terminals that are included in the node information locally held by the communication terminal is information to be held, the communication terminal references, in the node information locally held by the communication terminal, a node information entry corresponding to each of the routing information entries or references, in the routing information locally held by the communication terminal, a routing information entry corresponding to each of the node information entries; and if a node information entry corresponding to the routing information entry does not exist, the communication terminal deletes the relevant routing information entry from the routing information locally held by the communication terminal, or if a routing information entry corresponding to the node information entry does not exist, the communication terminal deletes the relevant node information entry from the node information locally held by the communication terminal.

(3) A third method for exchanging information between communication terminals according to the present invention is a method for exchanging node information and routing information between a plurality of communication terminals constituting a network, the node information being used for identifying each of the communication terminals, the routing information indicating a communication route to each of communication terminals which is a destination; wherein when each of the plurality of communication terminals determines whether or not each of the routing information entries relating to the communication terminals that are included in the routing information locally held by the communication terminal or each of the node information entries relating to the communication terminals that are included in the node information locally held by the communication terminal is information to be held, the communication terminal references, in the node information locally held by the communication terminal, a node information entry corresponding to each of the routing information entries or references, in the routing information locally held by the communication terminal, a routing information entry corresponding to each of the node information entries; and if a node information entry corresponding to the routing information entry does not exist, the communication terminal places the relevant routing information entry on an own list of candidates to be deleted at the communication terminal, stores the own list of candidates to be deleted at the communication terminal, and sends the own list of candidates to be deleted at the communication terminal to another communication terminal as a list of candidates to be deleted at a correspondent communication terminal, or if a routing information entry corresponding to each of the node information entries does not exist, places the relevant node information entry on an own list of candidates to be deleted at the communication terminal, stores the own list of candidates to be deleted at the communication terminal, and sends the own list of candidates to be deleted at the communication terminal to another communication terminal as a list of candidates to be deleted at a correspondent communication terminal; when the communication terminal receives the list of candidates to be deleted at the correspondent communication terminal from another communication terminal, the communication terminal determines, on the basis of a combination of the routing information entry or the node information entry placed on the received list of candidates to be deleted at the correspondent communication terminal and the routing information entry or the node information entry placed on the stored own list of candidates to be deleted at the communication terminal, whether or not each of the routing information entries locally held by the communication terminal is to be kept held or whether or not each of the node information entries locally held by the communication terminal is to be kept held; and the communication terminal deletes the routing information entry determined to be invalid information that does not need to be kept held from the routing information locally held by the communication terminal, or deletes the node information entry determined to be invalid information that does not need to be kept held from the node information held locally by the communication terminal.

(4) A first communication terminal according to the present invention is a communication terminal which exchanges node information and routing information with one or more other communication terminals constituting a network, the node information being used for identifying each of a plurality of communication terminals, the routing information indicating a communication route to each of communication terminals which is a destination, the communication terminal comprises at least means for: upon detection of update of a routing information entry relating to any of the communication terminals in the routing information held by the communication terminal or update of a node information entry relating to any of the communication terminals in the node information held by the communication terminal, referencing, in the node information held by the communication terminal, a node information entry corresponding to the updated routing information entry or, referencing, in the routing information held by the communication terminal, a routing information entry corresponding to the updated node information entry; and if the corresponding node information entry or the corresponding routing information entry does not exist, acquiring the corresponding node information entry or the corresponding routing information entry from another communication terminal.

(5) A second communication terminal according to the present invention is a communication terminal which exchanges node information and routing information with one or more other communication terminals constituting a network, the node information being used for identifying each of a plurality of communication terminals, the routing information indicating a communication route to each of communication terminals which is a destination, the communication terminal comprises at least means for: when determining whether or not each of the routing information entries relating to the communication terminals that are included in the routing information held by the communication terminal or each of the node information entries relating to the communication terminals that are included in the node information held by the communication terminal is information to be held, referencing, in the node information locally held by the communication terminal, a node information entry corresponding to each of the routing information entries or referencing, in the routing information locally held by the communication terminal, a routing information entry corresponding to each of the node information entries; and if a node information entry corresponding to the routing information entry does not exist, deleting the relevant routing information entry from the routing information locally held by the communication terminal, or if a routing information entry corresponding to the node information entry does not exist, deleting the relevant node information entry from the node information locally held by the communication terminal.

(6) A third communication terminal according to the present invention is a communication terminal which exchanges node information and routing information with one or more other communication terminals constituting a network, the node information being used for identifying each of a plurality of communication terminals, the routing information indicating a communication route to each of communication terminals which is a destination, the communication terminal comprises at least means for: when determining whether or not each of the routing information entries relating to the communication terminals that are included in the routing information held by the communication terminal or each of the node information entries relating to the communication terminals that are included in the node information held by the communication terminal is information to be held, referencing, in the node information held by the communication terminal, a node information entry corresponding to each of the routing information entries or referencing, in the routing information held by the communication terminal, a routing information entry corresponding to each of the node information entries; and if a node information entry corresponding to the routing information entry does not exist, placing the relevant routing information entry on an own list of candidates to be deleted at the communication terminal, storing the own list of candidates to be deleted at the communication terminal, and sending the own list of candidates to be deleted at the communication terminal to another communication terminal as a list of candidates to be deleted at a correspondent communication terminal, or if a routing information entry corresponding to each of the node information entries does not exist, placing the relevant node information entry on an own list of candidates to be deleted at the communication terminal, storing the own list of candidates to be deleted at the communication terminal, and sending the own list of candidates to be deleted at the communication terminal to another communication terminal as a list of candidates to be deleted at a correspondent communication terminal; when the communication terminal receives the list of candidates to be deleted at the correspondent communication terminal from another communication terminal, determining, on the basis of a combination of the routing information entry or the node information entry placed on the received list of candidates to be deleted at the correspondent communication terminal and the routing information entry or the node information entry placed on the stored own list of candidates to be deleted at the communication terminal, whether or not each of the routing information entries held by the communication terminal is to be kept held or whether or not each of the node information entries held by the communication terminal is to be kept held; and deleting the routing information entry determined to be invalid information that does not need to be kept held from the routing information held by the communication terminal, or deleting the node information entry determined to be invalid information that does not need to be kept held from the node information held by the communication terminal.

Advantageous Effect of Invention

The method for exchanging information between communication terminals and a communication terminal according to the present invention have the following advantageous effects.

A first advantageous effect is that a node information entry and a routing information entry that relate to a particular communication terminal can be provided together to one or more communication terminals. This is because the method and the communication terminal have a mechanism that, when node information or routing information is exchanged, checks correspondences between node information entries and routing information entries held by the communication terminal and, if any of the node information entries or routing information entries is missing, acquires the missing information from another communication terminal.

A second advantageous effect is that the communication terminal can hold entries of both of node information and routing information relating to a particular communication terminal in pairs. This is because the method and the communication terminal have a mechanism that checks correspondences between node information entries and routing information entries held by the communication terminal and, if any of the node information entries and the routing information entries is missing, deletes a node information entry or routing information entry that does not have a corresponding entry.

BRIEF DESCRIPTION OF DRAWINGS

FIG. 3A is a table for illustrating an example of kind of node information managed by the communication terminal illustrated in FIG. 1, where a node ID 11 and a node IP address 12 relating to each communication terminal A1 are paired to form an entry and an expiration date and time 13 is provided for the entry.

FIG. 3B is a table for illustrating an example of kinds of node information managed by the communication terminal illustrated in FIG. 1, where a node ID 21 and a routing address 22 relating to each communication terminal A1 are paired to form an entry and an expiration date and time 23 is provided for the entry.

FIG. 3C is a table for illustrating an example of a kind of node information managed by the communication terminal illustrated in FIG. 1, where a node ID 31 and a node IP address 32 relating to each communication terminal A1 and a contents list 33 indicating a list of contents held by the communication terminal A1 are associated with each other to form an entry and an expiration date and time 34 is provided for each entry.

FIG. 4A is a table for illustrating an example of a kind of routing information managed by the communication terminal illustrated in FIG. 1, where an expiration date and time 43 is provided for the entry.

FIG. 4B is a table for illustrating an example of a kind of routing information managed by the communication terminal illustrated in FIG. 1, where a receipt time 53 or a creation date and time or update time of each entry is provided.

FIG. 4C is a table for illustrating an example of a kind of routing information managed by the communication terminal illustrated in FIG. 1, where a route score 63 is provided which is a value indicating the reachability of the destination communication terminal A1 of each entry.

FIG. 11 is a diagram for illustrating timings of providing node information and routing information held by a communication terminal (node) and periods during which the communication terminal (node) holds the node information and routing information according to an existing technique.

DESCRIPTION OF EMBODIMENTS

Figure 1:
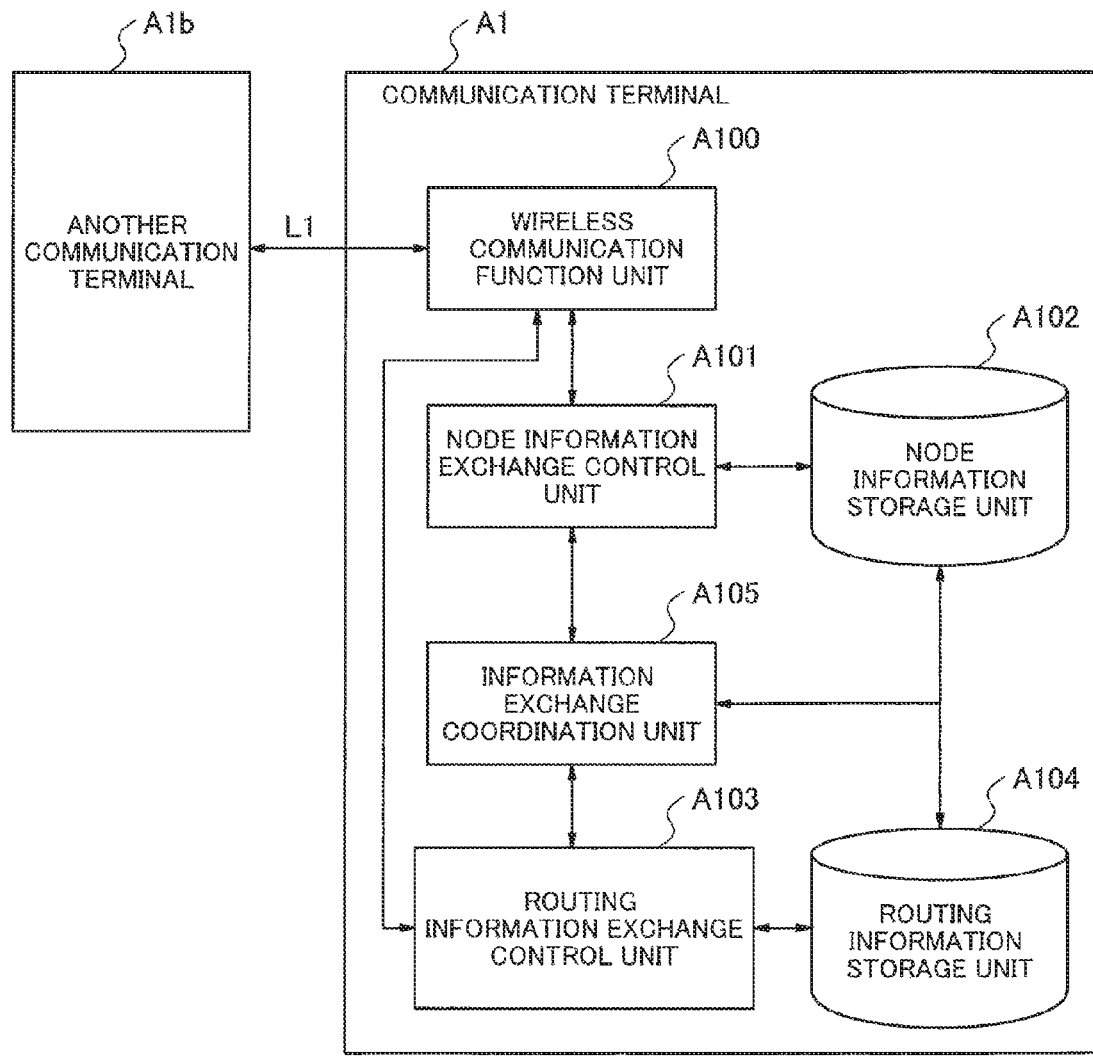
FIG. 1 is a block diagram illustrating an exemplary block configuration of a first embodiment of a communication terminal according to the present invention.
Figure 2A:
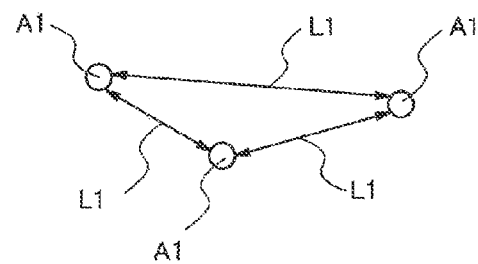
FIG. 2A is a network configuration diagram illustrating an example of a network environment of a mobile ad-hoc network (MANET) or a delay/disruption tolerant network (DTN) made up of three communication terminals A1 each of which is as illustrated in FIG. 1, where the three communication terminals A1 are interconnected through wireless communication links L1.
Figure 2B:
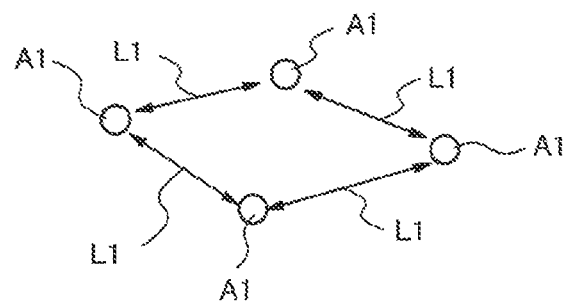
FIG. 2B is a network configuration diagram illustrating an example of a network environment of a mobile ad-hoc network (MANET) or a delay/disruption tolerant network (DTN) made up of four communication terminals each of which is as illustrated in FIG. 1, where each of the four communication terminals A1 is connected to two neighboring communication terminals A1 through wireless communication links L1.
Figure 2C:
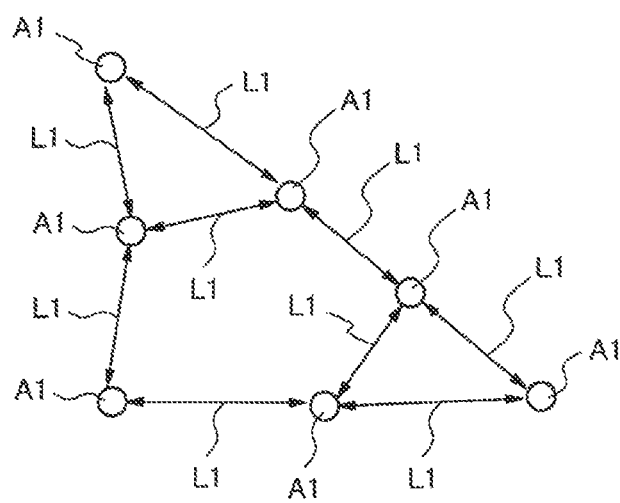
FIG. 2C is a network configuration diagram illustrating an example of a network environment of a mobile ad-hoc network (MANET) or a delay/disruption tolerant network (DTN) made up of seven communication terminals each of which is as illustrated in FIG. 1, where the seven communication terminals A1 are connected other communication terminals A1 through up to three wireless communication links L1.
Figure 2D:
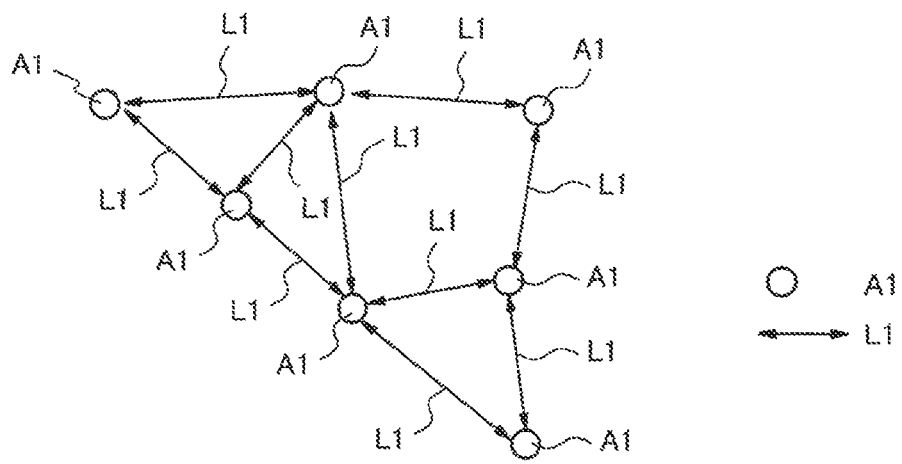
FIG. 2D is a network configuration diagram illustrating an example of a network environment of a mobile ad-hoc network (MANET) or a delay/disruption tolerant network (DTN) made up of seven communication terminals each of which is as illustrated in FIG. 1, where the seven communication terminals A1 are connected to other communication terminal A1 through up to four wireless communication links L1.

Preferred embodiments of a method for exchanging information between communication terminals and a communication terminal according to the present invention will be described with reference to the accompanying drawings. Note that while a method for exchanging information between communication terminals and a communication terminal according to the present invention will be described below, it would be understood that the method for exchanging information between communication terminals may be implemented as a computer-executable program for exchanging information between communication terminals or a program for exchanging information between communication terminals may be recorded on a computer-readable recording medium.

(Features of the Invention)

Prior to describing embodiments of the present invention, an overview of features of the present invention will be described first. A primary feature of the present invention is that both of node information and routing information that are held by a communication terminal (node) are checked and information exchange with another communication terminal (node) and managing information in the communication terminal (node) are performed on the basis of whether or not both of an entry of node information and an entry of routing information that correspond to each other exist.

Specifically, a primary feature of a communication terminal (node) is that the communication terminal includes information exchange coordination means which, upon reception of node information or routing information from another communication terminal (another node), checks whether or not an entry of routing information or node information corresponding to the node information or routing information is missing and, if missing, performs exchange of the missing routing information or node information, and held information coordination means which checks node information and routing information held by the communication terminal to determine whether or not an entry of routing information or node information corresponding to the node information or the routing information is missing and, if missing, deletes the node information or the routing information whose corresponding entry is missing.

More specifically, the present invention primarily includes a method for exchanging information between communication terminals and a communication terminal in the following modes.

A method for exchanging information between communication terminals in a first mode is a method for exchanging node information used for identifying each of a plurality of communication terminals constituting a network among the plurality of communication terminals and routing information indicating a communication route to each of the communication terminals which is a destination between communication terminals. The method is primarily characterized in that when each of the plurality of communication terminals constituting the network detects update of the routing information, for example, held by the communication terminal, the communication terminal references the node information entry corresponding to the updated routing information entry in the node information held by the communication terminal and, if a corresponding entry of the node information does not exists, acquires the node information entry from another communication terminal.

A communication terminal in a second mode is a communication terminal which constitutes a network with one or more other communication terminals and exchange node information used for identifying each of the communication terminals and routing information indicating a communication route to each of the communication terminal which is a destination with another communication terminal. Each of the plurality of communication terminals is primarily characterized in that when the communication terminal detects update of the routing information, for example, held by the communication terminal, the communication terminal references the node information entry corresponding to the updated routing information entry in the node information held by the communication terminal and, if a corresponding entry of the node information does not exists, acquires the node information entry from another communication terminal.

(Configuration of First Embodiment)

A first embodiment of the present invention will be described in detail below with reference to FIG. 1. FIG. 1 is a block diagram illustrating an exemplary block configuration of the first embodiment of a communication terminal according to the present invention.

As illustrated in FIG. 1, a communication terminal A1 includes at least a wireless communication function unit A100, a node information exchange control unit A101, a node information storage unit A102, a routing information exchange control unit A103, a routing information storage unit A104 and information exchange coordination unit A105.

In the communication terminal A1 in FIG. 1, the wireless communication function unit A100 is a component that performs wireless communication with another communication terminal A1b through a wireless communication link L1; the node information exchange control unit A101 is a component that controls exchange of node information with another communication terminal A1b; and the node information storage unit A102 is a component that stores node information held by the communication terminal A1. The routing information exchange control unit A103 is a component that controls exchange of routing information with another communication terminal A1b; and the routing information storage unit A104 is a component that stores routing information held by the communication terminal A1. The information exchange coordination unit A105 is a component that monitors the timings of exchanging node information and routing information. The other communication terminal A1b has exactly the same block configuration as the communication terminal A1 in FIG. 1.

By using a plurality of communication terminals A1 including the components depicted in FIG. 1, wireless communication is performed by means of the wireless communication function unit A100 through a wireless communication link L1 to interconnect the communication terminals, therefore a mobile ad-hoc network (MANET) or a delay/disruption tolerant network (DTN) can be constructed. The communication terminals A1 in the network may be moving or stationary.

FIG. 2 are network configuration diagrams illustrating examples of network environment of a mobile ad-hoc network (MANET) or a delay/disruption tolerant network (DTN) made up of communication terminals A1 each of which is as illustrated in FIG. 1. FIG. 2A illustrates a network configuration made up of three communication terminals A1 which are interconnected through wireless communication links L1; FIG. 2B illustrates a network configuration made up of four communication terminals A1 each of which is connected with two neighboring communication terminals A1 through wireless communication links L1. FIGS. 2C and 2D illustrate network configurations each being made up of seven communication terminals A1; FIG. 2C illustrates a network configuration where there are communication terminals A1 each of which is connected with other communication terminals A1 through up to three wireless communication links L1 and FIG. 2D illustrates a network configuration where there are communication terminals A1 each of which is connected with other communication terminals A1 through up to four wireless communication links L1.

The components of the communication terminal A1 illustrated in FIG. 1 will be described below in further detail.

(Description of Wireless Communication Function Unit A100)

The wireless communication function unit A100 will be described first. The wireless communication function unit A100 includes the function of transmitting node information and routing information received from the node information exchange control unit A101 and the routing information exchange control unit A103 to another communication terminal A1*b* through a wireless communication link L1. In addition, the wireless communication function unit A100 includes the function of, when receiving node information and routing information from the other communication terminal A1*b* through the wireless communication link L1, passing the node information and the routing information to the node information exchange control unit A101 and the routing information exchange control unit A103, respectively. For example, when the wireless communication function unit A100 receives node information from another communication terminal A1*b*, the wireless communication function unit A100 passes the received node information to the node information exchange control unit A101; when the wireless communication function unit A100 receives routing information, the wireless communication function unit A100 passes the received routing information to the routing information exchange control unit A103.

(Description of Node Information Exchange Control Unit A101)

The node information exchange control unit A101 will be described next. The node information exchange control unit A101 includes the function of exchanging node information that the communication terminal A1 holds in the node information storage unit A102 with another communication terminal A1*b* through the wireless communication function unit A100 at predetermined regular intervals, the function of exchanging node information with another communication terminal A1*b* through the wireless communication function unit A100 in response to an exchange start instruction from the information exchange coordination unit A105, and the function of managing updates of node information that the local communication terminal A1 holds in the node information storage unit A102.

There may be various kinds of node information as illustrated in FIGS. 3A to 3C. FIGS. 3A to 3C are tables for illustrating examples of kinds of node information managed by the communication terminal A1 illustrated in FIG. 1.

Various kinds of information may be contemplated such as node information N110 illustrated in FIG. 3A in which a node ID 11 and a node IP address 12 relating to each communication terminal A1 are paired to form an entry and an expiration date and time 13 is provided for the entry, or node information N120 illustrated in FIG. 3B in which a node ID 21 and a routing address 22 (a special address that serves as a substitute for an IP address in layered routing or a special address used in routing) relating to each communication terminal A1 are paired to form an entry and an expiration date and time 23 is provided for the entry, or node information N130 illustrated in FIG. 3C in which a node ID 31 and a node IP address 32 relating to each communication terminal A1, and a contents list 33 indicating a list of contents held by the communication terminal A1 are associated to form an entry and an expiration date and time 34 is provided for the entry, for example.

Furthermore, other node information can be contemplated in which the kinds of node information in FIGS. 3A, 3B and 3C are combined. For the sake of simplicity, the node information N110 illustrated in FIG. 3A, i.e. the node information in which a node ID 11 and a node IP address 12 relating to each communication terminal A1 are paired to form an entry and an expiration date and time 13 for the entry of each communication terminal A1 is provided will be used in the following description.

Furthermore, the node information exchange control unit A101 also manages updates of node information stored in the node information storage unit A 102. For the management of updates of the node information, when the node information exchange control unit A 101 receives node information from the wireless communication function unit A100, for example, the node information exchange control unit A 101 reads node information stored in the node information storage unit A102 and compares the read node information with the received node information to determine whether or not the information needs to be updated.

If the node information is a new node information entry that has not been stored in the node information storage unit A102, the node information exchange control unit A101 adds the new node information entry to the existing node information; if the node information is new information relating to a known node information entry stored in the node information storage unit A102, the node information exchange control unit A101 overwrites the node information in the node information storage unit A102 with the received new node information entry to update the node information held by the communication terminal A1. In doing so, the node information exchange control unit A101 also updates the expiration date and time in accordance with the addition or update of the node information entry. Then the node information exchange control unit A101 passes the node information added or updated to the node information storage unit A102 for storage.

Furthermore, the node information exchange control unit A101 monitors the expiration dates and times of the node information stored in the node information storage unit A102 at predetermined regular intervals. When the node information exchange control unit A101 detects that an expiration date and time has passed with the passage of time, the node information exchange control unit A101 performs processing for deleting the node information entry that has the passed expiration date and time (i.e. an entry whose expiration date and time is earlier than the current time or an entry for which an invalid-entry flag is set indicating that the entry is a node information entry that is not used in information exchange) for node information update management.

Furthermore, when a periodic node information exchanging timing is reached, the node information exchange control unit A101 retrieves node information managed by the communication terminal A1 from the node information storage unit A102 and passes the node information to the wireless communication function unit A100 to transmit the node information to another communication terminal A1*b* through the wireless communication link L1. Moreover, when the node information exchange control unit A101 receives a node information exchange start instruction from the information exchange coordination unit A105, the node information exchange control unit A101 retrieves node information managed by the communication terminal A1 from the node information storage unit A102 and passes the node information to the wireless communication function unit A100 to transmit the node information to the other communication terminal A1*b* through the wireless communication link L1.

(Description of Node Information Storage Unit A102)

The node information storage unit A102 will be described next. The node information storage unit A102 includes the function of storing node information managed by the local communication terminal A1. Specifically, when the node information storage unit A102 receives node information from the node information exchange control unit A101, the node information storage unit A102 stores the node information. Furthermore, the node information storage unit A 102 also includes the function of, in response to a node information read request from the node information exchange control unit A101 or the information exchange coordination unit A105, sending currently stored node information to the requesting node information exchange control unit A101 or information exchange coordination unit A105.
(Description of Routing Information Exchange Control Unit A103)

The routing information exchange control unit A103 will be described next. The routing information exchange control unit A103 includes the function of exchanging routing information held by the communication terminal A1 in the routing information storage unit A104 with another communication terminal A1b through the wireless communication function unit A100 at predetermined regular intervals, the function of exchanging routing information with another communication terminal A1b through the wireless communication function unit A100 in response to an exchange start instruction from the information exchange coordination unit A105, and the function of managing updates of routing information held by the communication terminal A1 in the routing information storage unit A104.

There may be various kinds of routing information as illustrated in FIGS. 4A to 4C. FIGS. 4A to 4C are tables for illustrating examples of kinds of routing information managed by the communication terminal A1 illustrated in FIG. 1.

Various kinds of information may be contemplated such as routing information R110 illustrated in FIG. 4A in which a destination IP address 41 indicating the IP address (Dest. IP address) of each destination communication terminal A1 and a next-hop IP address 42 indicating the IP address (Next hop IP address) of a next-hop communication terminal are paired to form an entry and an expiration date and time 43 is provided for the entry, or routing information R120 illustrated in FIG. 4B in which a destination IP address 51 indicating the IP address of each destination communication terminal A1 and a next-hop IP address 52 indicating the IP address of a next-hop communication terminal are paired to form an entry and a receipt time 53 or a creation date and time or update time is provided for the entry, or routing information R130 illustrated in FIG. 4C in which a destination IP address 61 indicating the IP address of each destination communication terminal A1 and a next-hop IP address 62 indicating the IP address of a next-hop communication terminal are paired to form an entry and a route score 63 which is a value indicating the reachability of the destination communication terminal A1 in the entry is provided, for example. The route score 63 is also used for determining whether or not the entry has expired and, when the route score 63 becomes less than or equal to a predetermined threshold value, the entry is considered to be equivalent to an expired entry and is deleted as invalid routing information.

Furthermore, other routing information can be contemplated in which kinds of node information in FIGS. 4A, 4B and 4C are combined. For the sake of simplicity, the routing information R110 illustrated in FIG. 4A, i.e. the routing information in which a destination IP address 41 and a next-hop IP address 42 relating to each destination communication terminal A1 are paired to form an entry and an expiration date and time 43 of the entry of each communication terminal A1 is provided will be used in the following description.

Furthermore, the routing information exchange control unit A103 also manages updates of routing information stored in the routing information storage unit A104. For the management of updates of the routing information, when the routing information exchange control unit A103 receives routing information from the wireless communication function unit A100, for example, the routing information exchange control unit A103 reads routing information stored in the routing information storage unit A104 and compares the read routing information with the received routing information to determine whether or not the information needs to be updated.

If the routing information is a new routing information entry that has not been stored in the routing information storage unit A104, the routing information exchange control unit A103 adds the new routing information entry to the existing routing information; if the routing information is new information relating to a known routing information entry stored in the routing information storage unit A104, the routing information exchange control unit A103 overwrites the routing information in the routing information storage unit A104 with the received new routing information entry to update the routing information held by the communication terminal A1. In doing so, the routing information exchange control unit A103 also updates the expiration date and time in accordance with the addition or update of the routing information entry. Then the routing information exchange control unit A103 passes the routing information added or updated to the routing information storage unit A104 for storage.

Furthermore, the routing information exchange control unit A103 monitors the expiration dates and times of the routing information stored in the routing information storage unit A104 at predetermined regular intervals. When the routing information exchange control unit A103 detects that an expiration date and time has passed with the passage of time, the routing information exchange control unit A103 performs processing for deleting the routing information entry that has the passed expiration date and time (i.e. an entry whose expiration date and time is earlier than the current time, or an entry for which an invalid-entry flag is set indicating that the entry is a routing information entry that is not used in information exchange, or an entry whose route score becomes less than or equal to a predetermined threshold) for routing information update management.

Furthermore, when a periodic routing information exchanging timing is reached, the routing information exchange control unit A103 retrieves routing information managed by the communication terminal A1 from the routing information storage unit A104 and passes the routing information to the wireless communication function unit A100 to transmit the routing information to another communication terminal A1b through the wireless communication link L1. Moreover, when the routing information exchange control unit A103 receives a routing information exchange start instruction from the information exchange coordination unit A105, the routing information exchange control unit A103 retrieves routing information managed by the communication terminal A1 from the routing information storage unit A104 and passes the routing information to the wireless communication function unit A100 to transmit the routing information to the other communication terminal A1b through the wireless communication link L1.

(Description of Routing Information Storage Unit A104)

The routing information storage unit A104 will be described next. The routing information storage unit A104 includes the function of storing routing information managed by the communication terminal A1. When the routing information storage unit A104 receives routing information from the routing information exchange control unit A103, the routing information storage unit A104 stores the routing information. Furthermore, the routing information storage unit A104 also includes the function of, in response to a routing information read request from the routing information exchange control unit A103 or the information exchange coordination unit A105, sending currently stored routing information to the requesting routing information exchange control unit A103 or information exchange coordination unit A105.

(Description of Information Exchange Coordination Unit A105)

The information exchange coordination unit A105 will be described next. The information exchange coordination unit A105 includes the function of monitoring node information stored in the node information storage unit A102 and routing information stored in the routing information storage unit A104 at predetermined regular intervals to detect whether or not addition of new information to or update of both of the node information and routing information has occurred as a result of information exchange with another communication terminal A1b. When the information exchange coordination unit A105 detects addition to or update of only one of the node information and the routing information, the information exchange coordination unit A105 sends an exchange start instruction to the node information exchange control unit A101 or the routing information exchange control unit A103 to instruct to start exchange of the other information (node information or routing information) to which addition of new information or update has not occurred.

Figure 5:
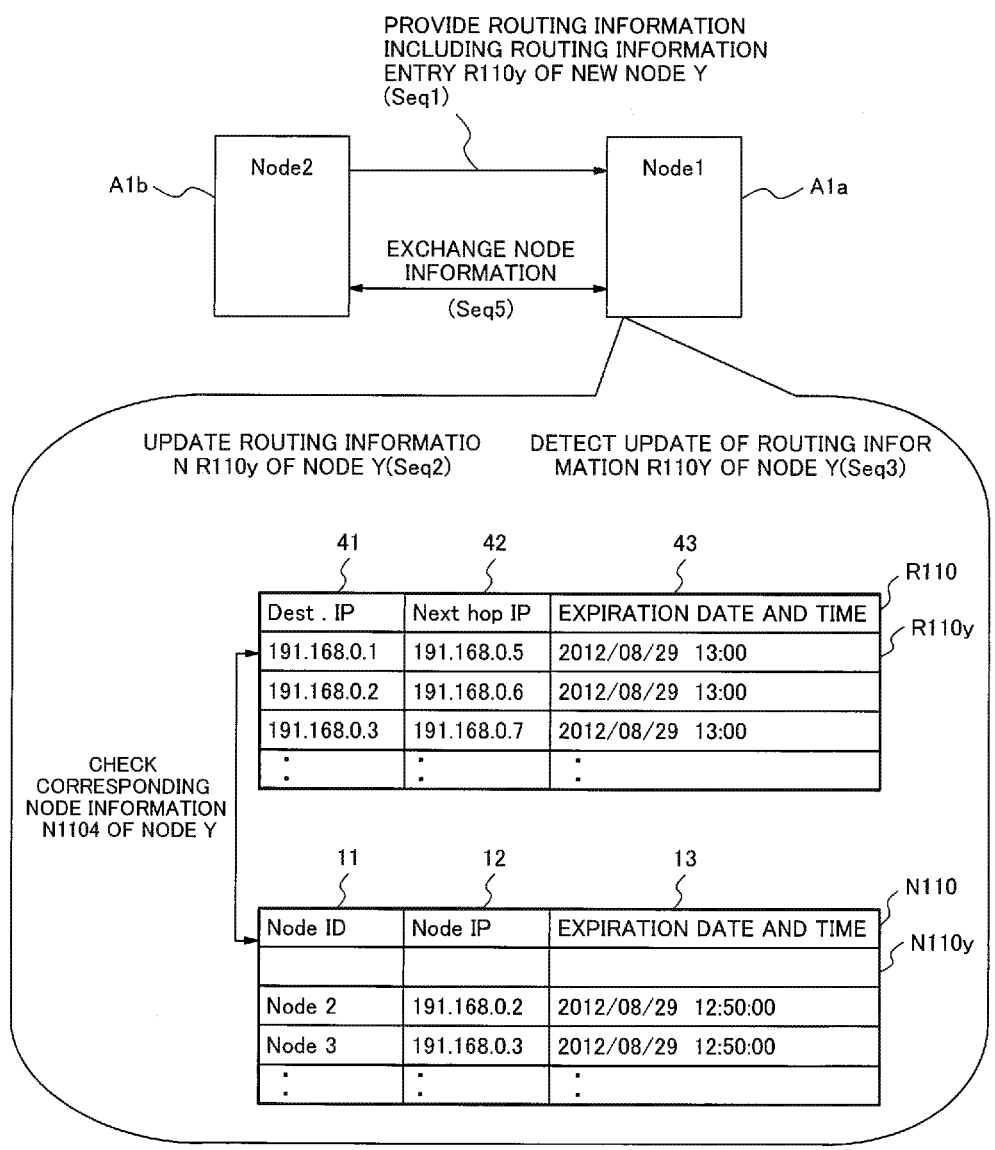
FIG. 5 is a diagram for illustrating an example of an operation of the communication terminal illustrated in FIG. 1 as the first embodiment.

For example, the information exchange coordination unit A105 performs an operation illustrated in the diagram of FIG. 5. FIG. 5 is a diagram for illustrating an example of an operation of the communication terminal A1 illustrated in FIG. 1 as the first embodiment. The diagram of FIG. 5 illustrates an example of an operation in which the communication terminal A1a (node 1) receives a routing information entry R110y relating to another communication terminal Y from another, neighboring communication terminal A1b (node 2) connected to the communication terminal A1a and, when the routing information entry R110y relating to the communication terminal Y is updated but a node information entry N110y corresponding to the routing information entry R110y relating to the communication terminal Y does not exist, the communication terminal A1a starts exchanging the node information entry N110y relating to the communication terminal Y with the connected neighboring communication terminal A1b (node 2).

In the diagram of FIG. 5, the communication terminal A1a (node 1) holds node information N110 and routing information R110 in the node information storage unit A102 and the routing information storage unit A104, respectively. A situation will be described below in which the routing information R110 is updated first.

As illustrated in the diagram of FIG. 5, when the communication terminal A1a (node 1) receives a routing information message including a routing information entry R110y relating to a new, another communication terminal Y from another communication terminal A1b (sequence Seq1), the routing information exchange control unit A103 updates the routing information R110 stored in the routing information storage unit A104 to add the routing information entry R110y relating to the new communication terminal Y (sequence Seq2).

On the other hand, the information exchange coordination unit A105 monitors the routing information R110 stored in the routing information storage unit A104 at predetermined regular intervals as stated above. When the information exchange coordination unit A105 detects update of the routing information entry R110y relating to the communication terminal Y (sequence Seq3), the information exchange coordination unit A105 performs an operation for determining whether or not a node information entry N110y that corresponds to the routing information entry R110y relating to the communication terminal Y exists in the node information storage unit A102 (sequence Seq4).

When the node information entry N110y that corresponds to the updated routing information entry R110y relating to the communication terminal Y does not exist in the node information storage unit A102, the information exchange coordination unit A105 sends an exchange start instruction for the node information entry N110y relating to the communication terminal Y to the node information exchange control unit A101 to cause the node information exchange control unit A101 to start an operation for exchanging the node information entry N110y relating to the communication terminal Y with the other communication terminal A1b (sequence Seq5).

Note that it is assumed in the diagram of FIG. 5 that the communication terminal A1a (node 1) is located within a range in which the communication terminal A1a (node 1) can communication with the neighboring other communication terminal A1b (node 2) and is connected with the neighboring communication terminal A1b (node 2) through a wireless communication link L1. The communication terminal A1a (node 1) has received a new routing information entry R110y for routing to the communication terminal Y from the connected other communication terminal A1b (node 2) as indicated by sequence Seq1.

When the information exchange coordination unit A105 detects that addition or update of the routing information entry R110y for routing to the other communication terminal Y has occurred in the routing information R110 held in the routing information storage unit A104 of the communication terminal A1a (node 1) as indicated by sequence Seq3, the information exchange coordination unit A105 performs an operation for determining whether or not a node information entry N110y relating to the other communication terminal Y that corresponds to for which the routing information entry R110y has been newly added or updated is recorded in the node information storage unit A102, as indicated by sequence Seq4.

The determination as to whether or not a node information entry N110y that corresponds to the routing information entry R110y relating to the other communication terminal Y is recorded in the node information storage unit A102 may be made by comparing the destination IP address in the routing information entry R110y recorded in the destination IP address 41 in the routing information storage unit A104 with each of the node IP addresses recorded in the node IP address 12 in the node information storage unit A102. In other words, since common items (IP addresses, i.e. node IP addresses 12 and destination IP addresses 41 in the first embodiment) are stored in the node information and the routing information so that mutually corresponding entries of the both kinds of information can be cross-referenced, the common items of information may be used to identify corresponding entries between the node information and the routing information.

If a node information entry N110y that corresponds to the routing information entry R110y relating to the communication terminal Y is not recorded in the node information storage unit A102, the node information entry N110y relating to the other communication terminal Y needs to be acquired from the neighboring communication terminal A1b. Therefore the information exchange coordination unit A105 sends a node information exchange start instruction to the node information exchange control unit A101. The node information exchange control unit A101 receives the node information exchange start instruction and performs an operation for exchanging node information with the communication terminal A1b through the wireless communication function unit A100 in order to acquire the node information entry N100y relating to the other communication terminal Y as indicated by sequence Seq5.

If the node information entry N110y that corresponds to the routing information entry R110y relating to the communication terminal Y is recorded in the node information storage unit A102 but a predetermined period of time has elapsed since the creation of the node information entry N110y and the expiration date and time has passed, the information exchange coordination unit A105 determines that the node information entry N110y has been expired, deletes the node information entry N110y and may send a node information exchange start instruction to the node information exchange control unit A101 in order to acquire the node information entry N110y relating to the communication terminal Y anew from the communication terminal A1b.

On the other hand, if the node information entry N110y that corresponds to the routing information entry R110y relating to the communication terminal Y is recorded in the node information storage unit A102 and the predetermined period of time has not elapsed since the creation of the node information entry N110y the information exchange coordination unit A105 determines that the operation for exchanging the routing information entry R110y relating to the other communication terminal Y does not need to be performed and therefore does not perform the subsequent process.

While the operation that starts in response to receipt of new routing information has been described above, the same process may be performed in response to receipt of new node information, in which case the term routing information and the term node information in the foregoing description are interchanged.

Thus, when only one of a pair of a rouging information entry R110y and a node information entry N110y relating to another communication terminal Y is added or updated, the communication terminal A1a (node 1) can add or update both of the routing information entry R100y and the node information entry N110y relating to the other communication terminal Y at substantially the same time, instead of adding or updating only one of the routing information entry R110y and the node information entry N110y relating to the other communication terminal Y, by performing the operation illustrated in FIG. 5. In this way, the communication terminal A1a (node 1) is allowed to provide both of node information and routing information relating to a particular communication terminal together to another communication terminal (for example the communication terminal A1b (node 2)) during information exchange with the other communication terminal.

Furthermore, addition of new information to or update of node information or routing information may be detected at the information exchange coordination unit A105 by performing the following process. When the information exchange coordination unit A105 references the node information storage unit A102 or the routing information storage unit A104 at predetermined regular intervals, the information exchange coordination unit A105 may read and store node information or routing information relating to each communication terminal. At each regular reference to node information or the routing information, the information exchange coordination unit A105 may check whether there is a difference between the node information or the routing information and the previously stored node information or routing information relating to each communication terminal to determine whether or not node information or routing information relating to each communication terminal has been added or updated.

Alternatively, when the node information exchange control unit A101 or the routing information exchange control unit A103 detects addition of new information to or update of node information or routing information, the node information exchange control unit A101 or the routing information exchange control unit A103 may notify the information exchange coordination unit A105 of the addition or the update.

Furthermore, the timing of performing detection of addition of new information to or update of node information or routing information at the information exchange coordination unit A105 may be as follows: when the node information exchange control unit A101 or the routing information exchange control unit A103 receives node information or routing information from the wireless communication function unit A100, the node information exchange control unit A101 or the routing information exchange control unit A103 may send a notification of the receipt to the information exchange coordination unit A105 and, in response to the notification, the information exchange coordination unit A105 may check the information in the node information storage unit A102 or the routing information storage unit A104 for addition or update, instead of checking at predetermined regular intervals. It is assumed in the following description that the information exchange coordination unit A105 monitors for addition or update of node information and routing information at predetermined regular intervals.

(Description of Operation of First Embodiment)

An example of an operation of the communication terminal A1 illustrated in FIG. 1 as the first embodiment will be described below in further detail with reference to the diagram of FIG. 5 and the flowchart of FIG. 6. The diagram of FIG. 5 illustrates an example of an operation for starting exchange of a node information entry N110y relating to another communication terminal Y between a communication terminal A1a (node 1) and another communication terminal A1b (node 2) as described above.

Figure 6:
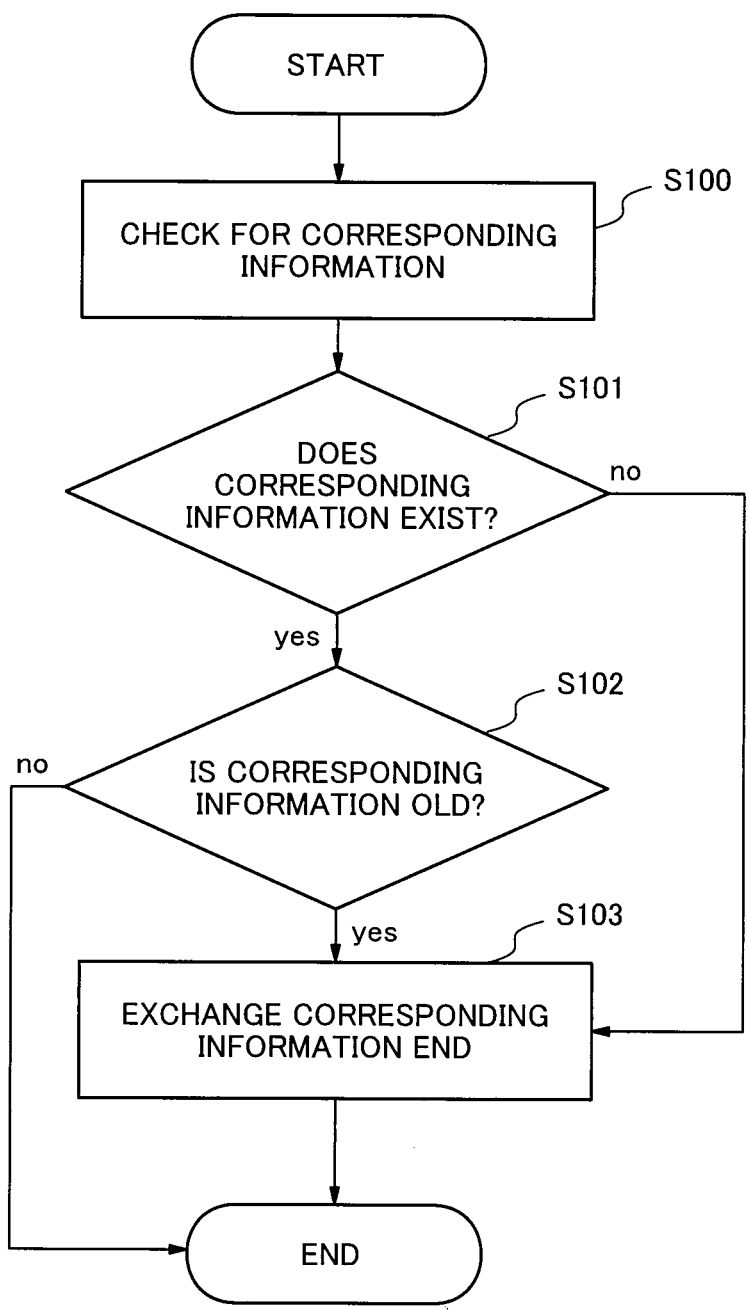
FIG. 6 is a flowchart illustrating an example of an operation of the communication terminal illustrated in FIG. 1 as the first embodiment.

FIG. 6 is a flowchart illustrating an example of an operation of the communication terminal A1 illustrated in FIG. 1 as the first embodiment. FIG. 6 illustrates an example of a process flow in which the information exchange coordination unit A105 in the communication terminal A1a (node 1) in the diagram of FIG. 5 monitors for addition of new information to or update or expiration of node information or routing information at predetermined regular intervals and starts the operation for exchanging required node information or routing information with another communication terminal (the communication terminal A1b in FIG. 5) connected to the communication terminal A1a as needed. In other words, FIG. 6 illustrates an example of an operation that enables both of node information and routing information, rather than only one of the node information and the routing information, to be passed at substantially the same time.

Note that the process in the flowchart of FIG. 6 illustrates the operation that is performed at predetermined regular intervals as described above. While the operation illustrated in FIGS. 5 and 6 is actually performed at each of the communication terminals that constitute a network as illustrated in any of FIGS. 2A to 2D, the following description will focus only on a communication terminal A1*a* (node 1) and another communication terminal A1*b* (node 2) illustrated in FIG. 5 among the communication terminals constituting the network, and be given on a case where an operation for exchanging node information and routing information between the two communication terminals is performed for simplicity.

First, it is assumed that the communication terminal A1*a* (node 1) and the other communication terminal A1*b* (node 2) illustrated in FIG. 5 are within a range in which the two communication terminals can communicate with each other and are interconnected through a wireless communication link L1, as described above. While node information may be received first or routing information may be received first in information exchange between the communication terminal A1*a* (node 1) and the other communication terminal A1*b* (node 2), only a pattern in which routing information is received first will be described below in detail since the same operation is performed for exchange of different kinds of information as noted previously.

As described previously with respect to sequence Seq1 in FIG. 5, the communication terminal A1*b* transmits routing information that the communication terminal A1*b* currently holds to the communication terminal A1*a* as periodic transmission of routing information. The communication terminal A1*a* receives the routing information from the communication terminal A1*b* through the wireless communication function unit A100 and passes the received routing information to the routing information exchange control unit A103.

The routing information exchange control unit A103 receives the received routing information (routing information including a routing information entry R110*y* relating to the communication terminal Y (node Y) in the example in FIG. 5) from the wireless communication function unit A100, generates a new entry with a destination IP address 41 (Dest. IP address) of '192.168.0.1', a next pop IP address 42 (Next-hop IP address) of '192.168.0.5', and an expiration date and time 43 of '2012/08/29 13:00:00' in order to adds the routing information entry R110*y* relating to the new communication terminal Y (node Y), for example, in the received routing information, updates the routing information with the entry R110*y*, and passes the updated routing information to the routing information storage unit A104. The routing information storage unit A 104 receives the routing information from the routing information exchange control unit A103 and stores the routing information as the latest routing information at the local communication terminal A1*a* as described with respect to sequence Seq2 in FIG. 5.

On the other hand, the communication terminal A1*a* is periodically monitoring node information in the node information storage unit A102 and routing information in the routing information storage unit A104 of the local communication terminal A1*a* for an update by using the information exchange coordination unit A105 all the while. Specifically, the information exchange coordination unit A105 reads routing information stored in the routing information storage unit A104 at predetermined regular intervals and uses the read routing information and the routing information stored by the information exchange coordination unit A105 at the previous checking to determine whether or not the routing information has been updated, as described above.

When the information exchange coordination unit A105 detects update of the routing information entry R110*y* relating to the communication terminal Y (node Y) as a result of the checking as described previously with respect to sequence Seq3 in FIG. 5, the information exchange coordination unit A105 activates a determination process for exchange of node information and routing information with other communication terminals illustrated in the flowchart of FIG. 6.

When the process in the flowchart of FIG. 6 is activated, first the information exchange coordination unit A105 reads node information held by the local communication terminal A1*a* from the node information storage unit A102 in order to check information corresponding to the information found to be updated, i.e. a node information entry N110*y* relating to the communication terminal Y (node Y) that corresponds to the routing information entry R110*y* relating to the communication terminal Y (node Y) in this embodiment (step S100), and uses the updated routing information entry R110*y* relating to the communication terminal Y (node Y) to check whether or not a node information entry N110*y* corresponding to the routing information entry R110*y* exists in the node information held by the communication terminal A1*a* (step S101).

In this embodiment, checking is performed to determine whether or not a node information entry N110*y* in which the same node IP address as the IP address of the destination communication terminal Y, '192.168.0.1', written in the destination IP address 41 (Dest. IP address) in the updated routing information entry R110*y* in FIG. 5 is written in the node IP address 11 in FIG. 5 exists in the node information storage unit A102 as described above.

As described with reference to FIG. 5, in this embodiment, because a node information entry N110*y* with the same node IP address as the IP address of the destination communication terminal Y, '192.168.0.1', in the updated routing information entry R110*y* relating to the communication terminal Y (node Y) does not exist in the node information storage unit A102 (No at step S101), the information exchange coordination unit A105 determines that the updated routing information entry R110*y* relating to the communication terminal Y (node Y) is a newly added piece of information and the node information entry N110*y* corresponding to the routing information entry R110*y* relating to the communication terminal Y (node Y) needs to be newly acquired. The process therefore proceeds to step S103, where an operation for exchanging the corresponding information with a neighboring other communication terminal A1*b* connected to the communication terminal A1*a* is performed to acquire the corresponding information (step S103).

In this embodiment, the corresponding information exchanged at step S103 is the node information entry N110*y* relating to the communication terminal Y (node Y) as described above and the information exchange coordination unit A105 sends an exchange start instruction to the node information exchange control unit A101 to instruct the node information exchange control unit A101 to perform an operation to exchange node information including the node information entry N110*y* relating to the communication terminal Y (node Y) with the other communication terminal A1b. As a result, the node information entry N110y relating to the communication terminal Y (node Y) can be received from the other communication terminal A1b and the node information can be updated with the received node information entry N110y relating to the communication terminal Y (node Y) at the node information exchange control unit A101, the updated node information can be passed to the node information storage unit A102 and can be stored in the node information storage unit A102 (step S103). Thus, the communication terminal A1a (node 1) can update not only the routing information entry R110y relating to the communication terminal Y (node Y) but also the corresponding node information entry N110y relating to the communication terminal Y (node Y) at substantially the same time.

On the other hand, if the node information entry N110y with the same node IP address as the IP address of the destination communication terminal Y, '192.168.0.1', in the updated routing information entry R110y relating to the communication terminal Y (node Y) exists in the node information storage unit A102 at step S101 (Yes at step S101), the information exchange coordination unit A105 determines that the updated routing information entry R110y relating to the communication terminal Y (node Y) has not been newly added but already held routing information has been updated. Accordingly, the process proceeds to step S102 in order to check whether or not the node information entry N110y relating to the communication terminal Y (node Y) that is stored in the node information storage unit A102 correspondingly to the routing information entry R110y has become old and can no longer be used.

At step S102, the information exchange coordination unit A105 references the node information entry N110y relating to the communication terminal Y (node Y) that corresponds to the updated routing information entry R110y relating to the communication terminal Y (node Y) to determine whether or not the date written in the expiration date and time 13 in FIG. 5 is earlier than the current date, indicating that the node information entry N110y has expired (step S102).

If the information exchange coordination unit A105 determines that the information is expired old information (Yes at step S102), the information exchange coordination unit A105 deletes the node information entry N110y relating to the communication terminal Y (node Y) from the node information storage unite A102, then proceeds to step S103 and instructs the node information exchange control unit A101 to start an operation for exchanging information corresponding to the updated routing information entry R110y relating to the communication terminal Y (node Y), i.e. the node information including the node information entry N110y relating to the communication terminal Y (node Y). Accordingly, the node information exchange control unit A101 performs the operation for exchanging the node information including the node information entry N110y relating to the communication terminal Y (node Y) with the other communication terminal A1b to acquire the node information entry N110y relating to the communication terminal Y (node Y) (step S103).

On the other hand, at step S102, if the information exchange coordination unit A105 determines that the node information in the node information entry N110y relating to the communication terminal Y (node Y) that is stored in the node information storage unit A102 has not expired and is not obsolete (No at step S102), then the information exchange coordination unit A105 ends the process without performing further processing.

As described above in detail, the information exchange coordination unit A105 performs the process from step S100 through step S103 in FIG. 6 to enable the communication terminal A1a to be placed in a "state where both of node information and routing information are managed in association with each other or a state where both of the two kinds of information are held". In other words, when the communication terminal A1a exchanges routing information relating to a particular communication terminal, for example the communication terminal Y (node Y), with another communication terminal, for example the communication terminal A1b, connected to the communication terminal A1a, the communication terminal A1a can exchange not only the routing information relating to the particular communication terminal, for example the communication terminal Y (node Y), but also the corresponding node information, i.e. both of the routing information and the node information relating to the particular communication terminal, for example the communication terminal Y (node Y), at substantially the same time.

Note that while a case where routing information is received first has been described in the description of the diagram of FIG. 5 and the flowchart of FIG. 6 for the sake of simplicity, the same process is performed when node information is received first, except that the term routing information and the term node information in the foregoing description are interchanged, as noted above. Furthermore, when corresponding information is checked, expiration of a node information entry is considered to be equivalent to absence of the entry as noted above. In the case of a routing information entries, not only a routing information entry that has expired but also a routing information entry whose route score is less than or equal to a predetermined threshold value is considered to be equivalent to a missing entry, as noted above.

(Configuration of Second Embodiment)

Figure 7:
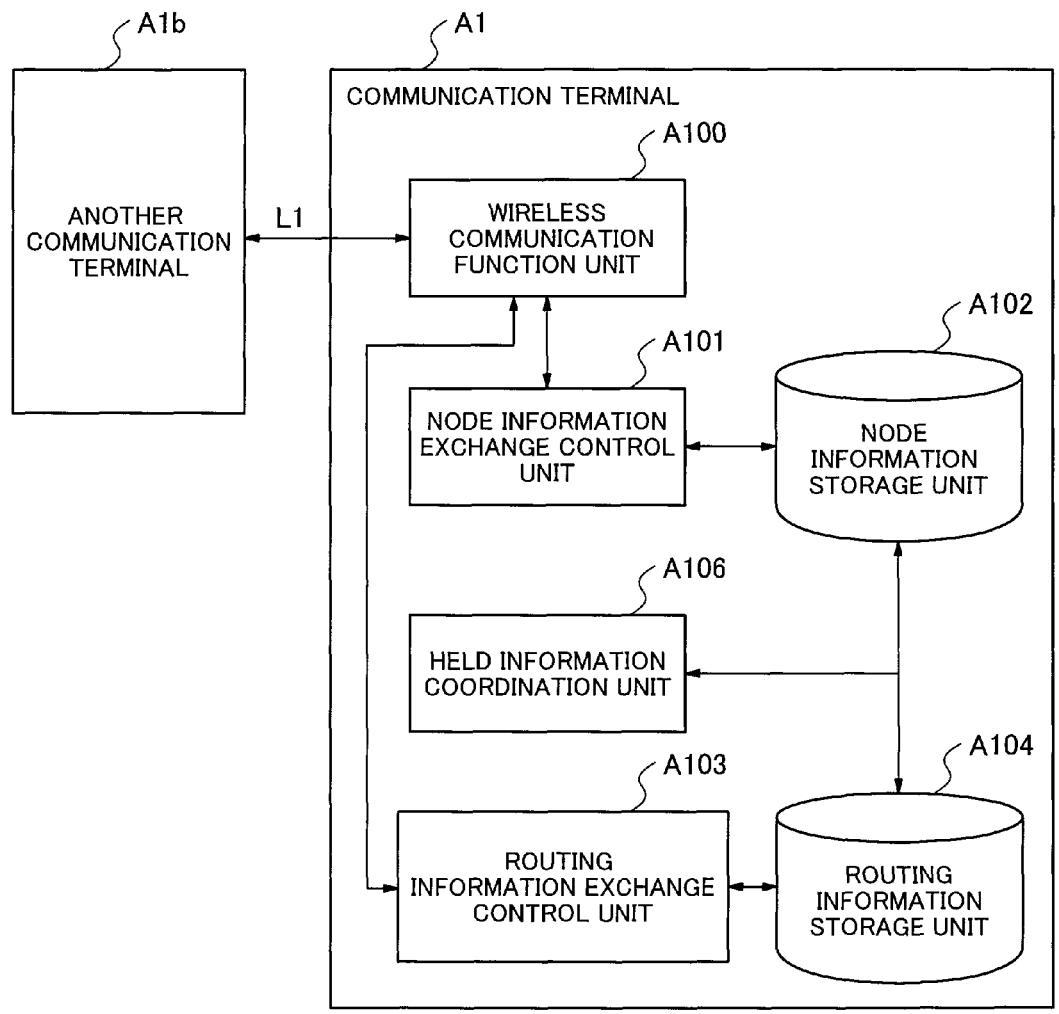
FIG. 7 is a block diagram illustrating an exemplary block configuration of a second embodiment of a communication terminal according to the present invention.

A second embodiment of the present invention will be described next in detail with reference to the block diagram of FIG. 7. FIG. 7 is a block diagram illustrating an exemplary block configuration of the second embodiment of a communication terminal according to the present invention.

The communication terminal A1 in FIG. 1 described as the first embodiment exchanges node information or routing information on the basis of whether or not both of an entry of node information and an entry of routing information that correspond to each other exist to acquire both of the node information and the routing information at substantially the same time and updates the information in the node information storage unit A102 and the routing information storage unit A104. The communication terminal A1 of the second embodiment illustrated in FIG. 7, on the other hand, determines whether or not an entry of node information or routing information is to be held by the communication terminal A1 on the basis of whether or not there is a corresponding entry of the other kind of information out of the node information and the routing information held by the communication terminal A1 and, if the communication terminal A1 determines that the information entry is not to be held by the communication terminal A1, the communication terminal deletes the relevant information stored in the node information storage unit A102 or the routing information storage unit A104.

For that purpose, the communication terminal A1 of the second embodiment illustrated in FIG. 7 newly includes a held information coordination unit A106 instead of the information exchange coordination unit A105 of the communication terminal A1 of the first embodiment illustrated in FIG. 1. The other components are the same as those of the communication terminal A1 of the first embodiment illustrated in FIG. 1. Therefore only the function of the new, held information coordination unit A106 will be described below and the repeated description of the other components will be omitted.

(Description of Held Information Coordination Unit A106)

The held information coordination unit A106 includes the function of checking routing information entries that correspond to node information entries stored in a node information storage unit A102 and node information entries that correspond to routing information entries stored in a routing information storage unit A104 at predetermined regular intervals and, if an entry of one of the node information and the routing information that corresponds to an entry of the other kind of information does not exist, or if a corresponding information entry exists but the entry has expired, deleting the information entry.

For example, when the held information coordination unit A106 periodically monitors routing information, the held information coordination unit A106 determines whether or not a node information entry held by the communication terminal A1 that corresponds to a routing information entry held by the communication terminal A1 in the routing information storage unit A104 exists in the node information storage unit A102, or whether or not such an existing corresponding entry has expired. If the corresponding node information entry does not exists in the node information storage unit A102 or if the corresponding node information exists in the node information storage unit A102 but has expired, the held information coordination unit A106 determines that the routing information entry is unnecessary and deletes the routing information entry from the routing information storage unit A104.

Similarly, when the held information coordination unit A106 periodically monitors the node information, the held information coordination unit A106 determines whether or not a routing information entry held by the communication terminal A1 that corresponds to a node information entry held by the communication terminal A1 in the node information storage unit A102 exists in the routing information storage unit A104, or whether or not such an existing corresponding entry has expired. If the corresponding routing information entry does not exists in the routing information storage unit A104 or if the corresponding routing information exists in the routing information storage unit A104 but has expired, the held information coordination unit A106 determines that the node information entry is unnecessary and deletes the node information entry from the node information storage unit A102.

In this way, a routing information entry corresponding to a node information entry or a node information entry corresponding to a routing information entry is checked to manage information to be locally held by the communication terminal A1.

Specifically, in addition to checking whether a corresponding information entry exists as described above, checking of the predetermined expiration dates and times of information entries is performed and an information entry whose expiration date and time has passed may be determined to be obsolete information that can no longer be used at the current time and may be deleted like an information entry that does not has a corresponding information entry. For example, in the case of node information entries, when the predetermined expiration date and time of a node information has passed, the node information entry may be determined to be invalid information that cannot be used and may be removed from the node information storage unit A102. In the case of routing information entries, when the route score value of a routing information entry becomes less than or equal to a predetermined threshold value, the routing information entry may be treated like an expired entry, may be considered to be invalid information that cannot be used and may be deleted from the routing information storage unit A104.

Furthermore, instead of or in addition to checking node information in the node information storage unit A102 and routing information in the routing information storage unit A104 of the communication terminal A1 at predetermined regular intervals, the held information coordination unit A106 may check the node information and the routing information held by the local communication terminal A1 at any of various set timings.

For example, before a node information exchange control unit A101 or a routing information exchange control unit A103 exchanges node information or routing information with a neighboring other communication terminal A1b through a wireless communication function unit A100, the node information exchange control unit A101 or the routing information exchange control unit A103 may send a notification of the exchange to the held information coordination unit A106. In response to the notification, the held information coordination unit A106 may check node information in the node information storage unit A102 or routing information in the routing information storage unit A104 of the local communication terminal A1. In this case, before performing the operation for exchanging node information or routing information, unnecessary information entries can be deleted and therefore the amount of information required to be exchanged with the other communication terminal A1b can be reduced.

Alternatively, when the node information exchange control unit A101 or the routing information exchange control unit A103 receives a notification of checking node information or routing information from a neighboring other communication terminal A1b through the wireless communication function unit A100, the node information exchange control unit A101 or the routing information exchange control unit A103 may send the received notification of checking to the held information coordination unit A106, and in response to the notification, the held information coordination unit A106 may check node information in the node information storage unit A102 or routing information in the routing information storage unit A104 of the local communication terminal A1.

In this case, when the held information coordination unit A106 detects a routing information entry or a node information entry that does not have a corresponding node information entry or a corresponding routing information entry, or detects a routing information entry or a node information entry that has a corresponding node information entry or routing information entry but has expired, the held information coordination unit A160 may send information about the detected routing information entry or node information entry as information indicating a candidate information entry to be deleted back to the neighboring communication terminal A1b that has sent the notification of checking. The neighboring communication terminal A1b which has received the sent back information can reference the information in determining whether or not there is an information entry to be deleted as will be described later.

Furthermore, when the held information coordination unit A106 determines whether or not information is to be held in the local communication terminal A1, the held information coordination unit A106 may also reference information at another communication terminal A1b located near the local communication terminal A1 instead of referencing only the information at the local communication terminal A1 as described above.

Figure 8:
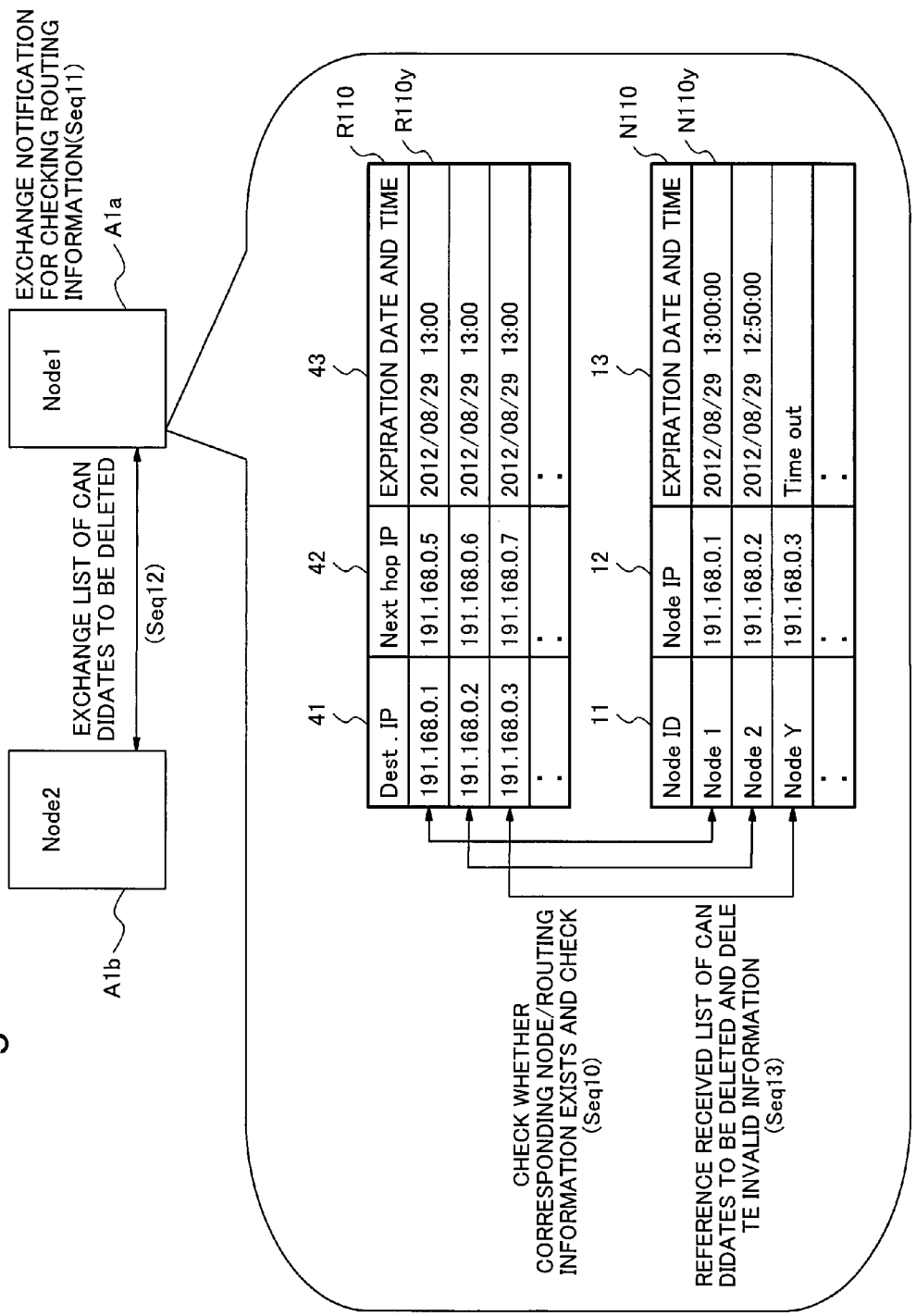
FIG. 8 is a diagram for illustrating an example of an operation of the communication terminal illustrated in FIG. 7 as the second embodiment.

For example, the held information coordination unit A106 may perform an operation illustrated in the diagram of FIG. 8. FIG. 8 is a diagram for illustrating an example of an operation of the communication terminal A1 illustrated in FIG. 7 as the second embodiment. The diagram of FIG. 8 illustrates both of an example of an operation in which the held information coordination unit A106 of the communication terminal A1a (node 1) uses information at the local communication terminal A1a (node 1) alone to determine which information is to be held and which formation is to be deleted out of the node information and the routing information held at the communication terminal A1a (node 1) and an example of an operation in which the held information coordination unit A106 also references information at a neighboring other communication terminal A1b (node 2) connected to the communication terminal A1 to determine information to be held and information to be deleted.

In the diagram of FIG. 8, the communication terminal A1a (node 1) holds node information N110 and routing information R110 in the node information storage unit A102 and the routing information storage unit A104, respectively. In the example described below, the routing information R110 is checked first.

As illustrated in the diagram of FIG. 8, if information to be held is determined using only the information in the local communication terminal A1a (node 1), the held information coordination unit A106 of the communication terminal A1a (node 1) first reads routing the information R110 held at the local communication terminal A1a (node 1) from the routing information storage unit A104. The held information coordination unit A106 then determines whether or not node information entries exist in the node information N110 stored in the node information storage unit A102 that correspond to routing information entries in the routing information R110, or whether or not corresponding node information entries in the node information N110 have expired (sequence Seq10).

The determination as to whether or not an entry of a node information N110 that corresponds to each entry of a routing information R110 relating to each communication terminal exists in the node information storage unit A102 may be made by comparing the destination IP address in the entry of the routing information R110 recorded in the destination IP address 41 (Dest. IP address) in the routing information storage unit A104 with each of the node IP addresses of each entry of the node information N110 recorded in the node IP address 12 in the node information storage unit A102, as described in the first embodiment.

The diagram of FIG. 8 illustrates a situation in which node information entries that have the same node IP addresses as the destination IP addresses of routing information entries in the routing information R110 relating to the communication terminals exist in the node information N110 and node information entries that correspond to the routing information entries relating to the communication terminals exist in the node information storage unit A 102. However, the node information entry N110y relating to a communication terminal Y (node Y) has expired as 'Time Out' is written in the expiration date and time 13 of the node information entry N110y (with a node IP address of '192.168.0.3') that corresponds to the routing information entry R110y relating to the communication terminal Y (node Y) (with a destination IP address of '192.168.0.3').

Accordingly, the held information coordination unit A106 determines that the node information entry N110y relating to the communication terminal Y (node Y) is equivalent to information that does not exist and that the routing information entry R110y and the node information entry N110y relating to the communication terminal Y (node Y) is information to be deleted, and immediately deletes the routing information entry R110y and the node information entry N110y. Note that since the routing information is checked at this point, the node information entry N110y that has expired may be deleted when checking the node information rather than deleting at this point.

Alternatively, the held information coordination unit A106 may check the expiration date and time written in the expiration date and time 13 of the node information entry N110y corresponding to the routing information entry R110y relating to the communication terminal Y (node Y) to be checked. If the node information entry N110y has expired, the held information coordination unit A160 may simply overwrite the expiration date and time 13 with 'Time Out' as illustrated in FIG. 8 and may leave the deletion of the node information entry N110y from the node information storage unit A102 to the node information exchange control unit A101. Similarly, the held information coordination unit A106 may simply overwrite the expiration date and time 43 of the routing information entry R110y relating to the communication terminal Y (node Y) to be checked with 'Time Out' and may leave the deletion of the routing information entry R110y from the routing information storage unit A104 to the routing information exchange control unit A103.

Similarly, the held information coordination unit A106 of the communication terminal A1a (node 1) determines whether or not routing information entries corresponding to the node information entries exist on the basis of the node information N110 held by the communication terminal A1a (node 1), or whether or not the corresponding routing information entries have expired (sequence Seq10). If a routing information entry that corresponds to a node information entry does not exist or if the expiration date and time of a routing information entry that is written in the expiration date and time 43 has passed, the held information coordination unit A106 determines that the node information entry or the node information entry and its corresponding routing information entry are information to be deleted.

In this way, if only the information at the local communication terminal A1a (node 1) is used to determine information to be held, the held information coordination unit A106 references node information N110 stored in the node information storage unit A102 of the communication terminal A1a (node 1) and the routing information R110 stored in the routing information storage unit A104 to check whether or not there are node information entries that correspond to the entries of the routing information R110 and routing information entries that correspond to the entries of the node information N110, and whether or not there are entries that have expired, thereby checking whether information is to be deleted or to be held. If an information entry that has not a corresponding information entry or that has expired is detected, the held information coordination unit A106 determines that the information entry is invalid information that does not need to be held and immediately deletes the information entry as information to be deleted or leave the deletion of the information entry to the node information exchange control unit A101 or the routing information exchange control unit A103, thereby preventing the information entry from being uselessly held.

Note that when the held information coordination unit A106 detects a predetermined expiration date and time of an information entry has passed, the held information coordination unit A106 may set an 'invalid-entry flag' indicating that the information entry is invalid information in the expiration date and time 13 or the expiration date and time 43 instead of overwriting with 'Time Out' as illustrated in FIG. 8, to leave the deletion of the information entry to the node information exchange control unit A101 or the routing information exchange control unit A103. When 'Time Out' or the 'invalid-entry flag' is set in the expiration date and time 13 or the expiration date and time 43, 'Time Out' or the 'invalid-entry flag' may be forcibly set in the expiration date and time 43 or the expiration date and time 13 of an information entry that corresponds to the information entry, as described above.

If information at a neighboring other communication terminal A1b (node 2) is used in addition to the information at the local communication terminal A1a (node 1) to determine information to be held at the local communication terminal A1a (node 1), the held information coordination unit A106 of the local communication terminal A1a (node 1) first performs an operation for exchanging a notification of checking of routing information with the held information coordination unit A106 of the neighboring communication terminal A1b (node 2) through the routing information exchange control unit A103 and the wireless communication function unit A100 as illustrated in the diagram of FIG. 8 (sequence Seq11).

The held information coordination unit A106 of the communication terminal A1a (node 1) receives the notification of routing information checking from the correspondent communication terminal A1b (node 2) and performs the checking operation described above as sequence Seq10, extracts routing information entries that do not have corresponding node information entries or routing information entries that have expired from the routing information entries of communication terminals at the local communication terminal A1a (node 1) as candidate information to be deleted, places the routing information entries on a list of candidates to be deleted (at the local communication terminal), stores the list, and sends the list of candidates to be deleted (at the local communication terminal) back to the correspondent communication terminal A1b (node 2) that has sent the checking notification as a list of candidates to be deleted (at the correspondent communication terminal) (sequence Seq12).

On the other hand, the held information coordination unit A106 of the correspondent communication terminal A1b (node 2), which has received the routing information checking notification from the communication terminal A1a (node 1), performs the same operation to extract candidate information to be deleted at the communication terminal A1b (node 2), places the candidate information on a list of candidates to be deleted (at the local communication terminal), stores the list, and sends the list of candidates to be deleted (at the local communication terminal) to the communication terminal A1a (node 1) that has sent the checking notification as a list of candidates to be deleted (at the correspondent communication terminal) (sequence Seq12).

The lists of candidates to be deleted that are exchanged between the communication terminal A1a (node 1) and the correspondent communication terminal A1b (node 2) need only to list common information for cross-referencing node information and routing information, i.e. information that identifies candidate information entries to be deleted and need to contain at least the IP addresses indicating the candidate communication terminals (nodes) to be deleted (i.e. node IP addresses in the node information and destination IP addresses in the routing information), as described above. In the example in FIG. 8, the node IP address '191.168.0.3' of the communication terminal Y (node Y) for which 'Time Out' is set in the expiration date and time 13 in the node information needs only to be listed as candidate routing information to be deleted (since the node information entry has been expired, the node information entry itself is candidate node information to be deleted, of course).

The held information coordination unit A106 of the communication terminal A1a (node 1) receives the list of candidates to be deleted from the communication terminal A1b (node 2) and uses the combination of the received list of candidates to be deleted (at the correspondent communication terminal) and the list of candidates to be deleted (at the local communication terminal) created and stored at the local communication terminal (node 1) through the checking operation described above as sequence Seq10 to determine invalid information that does not need to be held at the communication terminal A1a (node 1).

While only one other communication terminal A1b (node 2) is given as neighboring the communication terminal A1a (node 1) in FIG. 8, the present invention is not limited to this; a plurality of other communication terminals may be within an area in which the communication terminals can communicate with each other through wireless links. In that case, the local communication terminal A1a (node 1) sends a list of candidates to be deleted (at the local communication terminal) to each of the plurality of other communication terminals and receives lists of candidates to be deleted (at the correspondent communication terminals) from the plurality of other communication terminals.

Determination as to whether or not information is invalid information that does not need to be held may be made using various methods. For example, a method may be used in which if the IP address of the same communication terminal (for example the communication terminal Y (node Y) depicted in FIG. 8) is placed on all of the list of candidates to be deleted (at the local communication terminal) and the lists of candidates to be deleted (at the correspondent communication terminals) (i.e. if the IP address is in the product set of the list of candidates to be deleted at local communication terminal A1a and the lists of candidates to be deleted at all of the neighboring other communication terminals), it is determined that the node information and the routing information relating to the communication terminal identified by the IP address are invalid pieces of information that do not need to be held.

Alternatively, a method may be used in which if the IP address of a communication terminal (for example the communication terminal Y (node Y) depicted in FIG. 8) is placed on at least one of the list of candidates to be deleted (at the local communication terminal) and the lists of candidates to be deleted (at the correspondent communication terminals) (i.e. the IP address is in the union of the list of candidates to be deleted at the local communication terminal A1a and lists of candidates to be deleted at all of the neighboring other communication terminals), it is determined that the node information and the routing information relating to the communication terminal identified by the IP address are invalid pieces of information that do not need to be held.

Note that instead of using the lists of candidates to be deleted of all of the other communication terminals neighboring the local communication terminal A1a (the lists at the correspondent communication terminals), weights may be assigned to all of the other communication terminals using the intensity of electrical field between the local communication terminal A1a and each of the other communication terminals, communication terminals that have weights greater than or equal to a predetermined threshold value may be extracted from among the other communication terminals, and the lists of candidates to be deleted of the extracted communication terminals (the lists at the correspondent communication terminals) may be used together with the list of candidate to be deleted of the local communication terminal A1a (the list at the local communication terminal).

On the basis of any of the determination methods described above, the held information coordination unit A106 of the communication terminal A1a (node 1) identifies invalid information that does not need to be held and immediately deletes the invalid node information entries and routing information entries from the node information storage unit A102 and the routing information storage unit A104 to avoid uselessly holding the unnecessary node information entries and routing information entries of the communication terminals (sequence Seq13). Alternatively, the held information coordination unit A106 may set 'Time Out' or an 'invalid-entry flag' in the expiration date and time 13 or the expiration date and time 43 of the invalid node information entries or routing information entries to control the node information exchange control unit A101 or the routing information exchange control unit A103 to delete the node information entries or rouging information entries in which 'Time Out' or the 'invalid-entry flag' is set from the node information storage unit A102 or the routing information storage unit A104 (sequence Seq13).

While an operation has been described in the description of FIG. 8 that also uses information from another communication terminal A1b (node 2) neighboring the communication terminal A1a (node 1) and starts with exchange of a notification of checking routing information, the same process may be performed when exchanging a notification of checking node information, in which case the term routing information and the term node information in the foregoing description are interchanged.

Furthermore, while an operation has been described in which the local communication terminal A1a (node 1) and the neighboring other communication terminal A1b (node 2) synchronize with each other to exchange checking notifications and lists of candidates to be deleted at substantially the same time, there may be a lag between the timing of transmission of the checking notification from the communication terminal A1a (node 1) and the timing of transmission of the checking notification from the neighboring communication terminal A1b (node 2) within a predetermined allowable range in some cases.

In such cases, the union of the lists of candidates to be deleted at the local communication terminal A1a and all of the neighboring other communication terminals described above may be used to identify invalid information that does not need to be held. Specifically, first, a communication terminal at which receipt of a checking notification has been delayed (for example a communication terminal A1a (node 1) that has not received a checking notification from a neighboring other communication terminal A1b (node 2) within predetermined time) performs an operation for deleting invalid information that does not need to be held on the basis of a list of candidates to be deleted (at the local communication terminal) that has been generated and stored previously in the checking operation in sequence Seq10.

Then, upon receipt of a checking notification from the other correspondent communication terminal A1b (node 2) within predetermined time, the communication terminal sends the stored list of candidates to be deleted (at the local communication terminal) back to the other communication terminal A1b (node 2) as a list of candidates to be deleted (at the correspondent communication terminal). Then, upon receipt of a list of candidates to be deleted (at the correspondent communication terminal) from the correspondent communication terminal A1b (node 2), the communication terminal may perform an operation for deleting invalid information that does not need to be held on the basis of the received list of candidates to be deleted.

(Description of Operation of Second Embodiment)

An example of the control operation performed by the communication terminal A1 illustrated in FIG. 7 as the second embodiment for preventing the communication terminal A1 from uselessly holding only one of a pair of a node information entry and a routing information entry will be described below in further detail with reference to the diagram of FIG. 8 and a flowchart of FIG. 9. As stated previously, the diagram of FIG. 8 illustrates an example of the operation for deleting invalid information that does not need to be held on the basis of only the information at the communication terminal A1a (node 1) and an example of the operation for deleting invalid information that does not need to be held on the basis of a combination of a list of candidates to be deleted (at the local communication terminal) generated by the communication terminal A1a (node 1) and a list of candidates to be deleted (at the correspondent communication terminal) generated by another communication terminal A1b (node 2).

Figure 9:
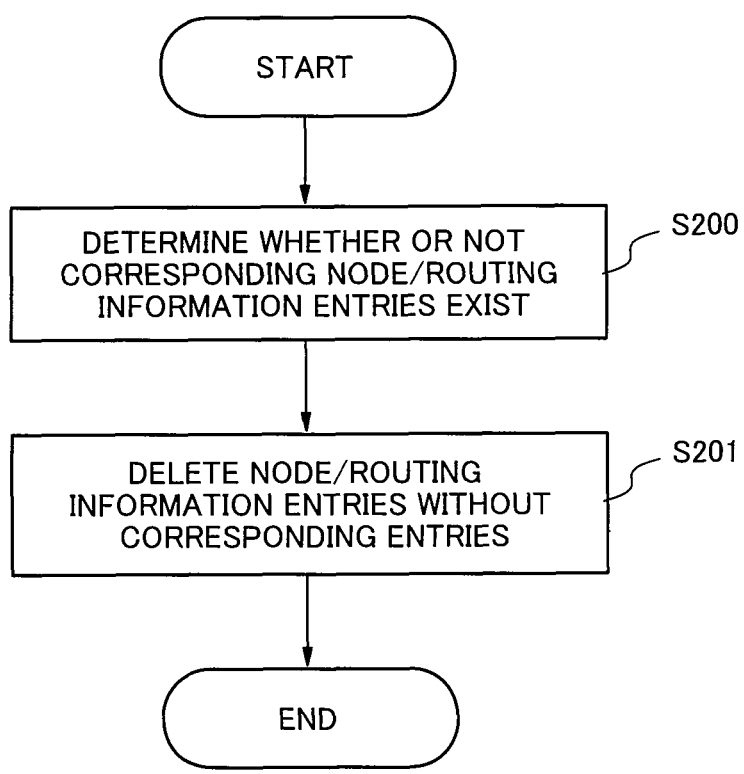
FIG. 9 is a flowchart illustrating an example of an operation of the communication terminal illustrated in FIG. 7 as the second embodiment.

FIG. 9 is a flowchart for illustrating an example of the operation of the communication terminal A1 illustrated in FIG. 7 as the second embodiment and illustrates an example of the operation for deleting invalid information by using only the information in the local communication terminal A1a (node 1) in FIG. 8 for the sake of simplicity. Specifically, the flowchart of FIG. 9 illustrates an example of the operation in which the held information coordination unit A106 in the communication terminal A1a (node 1) in the diagram of FIG. 8 checks routing information entries corresponding to node information entries stored in the node information storage unit A102 and node information entries corresponding to routing information entries stored in the routing information storage unit A104 at predetermined regular intervals and, if a node information entry that corresponds to a routing information entry does not exist or a routing information entry that corresponds to a node information entry does not exist, or an existing information entry has expired, the held information coordination unit A106 deletes the information entry.

Note that the process in the flowchart of FIG. 9 illustrates an example in which the held information coordination unit A106 checks node information and routing information at predetermined regular intervals. While, as in the first embodiment, the operation illustrated in the diagram of FIG. 8 and the flowchart of FIG. 9 is actually performed at each of the communication terminals that constitute a network as illustrated in any of FIGS. 2A to 2D, the following description will focus only on a communication terminal A1a (node 1) and another communication terminal A1b (node 2) illustrated in FIG. 8 among the communication terminals constituting the network, and be given on a case where an operation for exchanging node information and routing information between the two communication terminals is performed for simplicity.

First, it is assumed that the communication terminal A1a (node 1) and the other communication terminal A1b (node 2) illustrated in FIG. 8 are within a range in which the two communication terminals can communicate with each other and are interconnected through a wireless communication link L1, as described above. While a notification of checking node information may be received first or a notification of checking routing information may be received first in exchange of notification of checking information between the communication terminal A1a (node 1) and the other communication terminal A1b (node 2), only a pattern in which a notification of checking routing information is received first will be described below in detail since the same operation is performed for exchange of notifications of checking different kinds of information as described previously with respect to sequence Seq11 in FIG. 8.

In the diagram of FIG. 8, when the communication terminal A1a (node 1) uses only the information in the communication terminal A1a (node) to delete invalid information that does not need to be held to prevent keeping uselessly holding only one of a pair of a node information entry and a routing information entry, the operation described previously with respect to sequence Seq10 is performed first. Specifically, the held information coordination unit A106 references node information N110 stored in the node information storage unit A102 of the communication terminal A1a (node 1) and routing information R110 stored in the routing information storage unit A104 to check whether or not node information entries corresponding to the entries of the routing information R110 and routing information entries corresponding to the entries of the node information N110 exist and check whether or not an entry that has expired exists, thereby determining whether or not information is to be deleted or kept held.

When an information entry whose corresponding information entry does not exist or an existing corresponding information entry that has expired is detected, the held information coordination unit A106 determines that the information entry is invalid information and immediately deletes the information entry as information to be deleted to avoid uselessly holding or sets 'Time Out' or an 'invalid-entry flag' indicating that the information entry is invalid to leave the deletion of the invalid information to the node information exchange control unit A101 or the routing information exchange control unit A103.

Furthermore, if the communication terminal A1a (node 1) uses information in a neighboring other communication terminal A1b (node 2) in addition to the information in the communication terminal A1a (node 1) to delete invalid information that does not need to be held, the held information coordination unit A106 of the communication terminal A1a (node 1) exchanges checking notifications for checking whether invalid node information or invalid routing information exists with the other communication terminal A1b (node 2) as described previously with respect to sequence Seq11 in FIG. 8 (the notification for checking routing information in the example in FIG. 8).

The held information coordination unit A106 of the communication terminal A1a (node 1) receives the checking notification from the correspondent other communication terminal A1b (node 2), performs an operation similar to the checking operation in sequence Seq10 described previously with respect to sequence Seq12 in FIG. 8, extracts invalid information that does not need to be held, generates and stores a list of candidates to be deleted (at the local communication terminal), and sends the list of candidates to be deleted (at the local communication terminal) as a list of candidates to be deleted (at the correspondent communication terminal) back to the correspondent other communication terminal A1b (node 2) that has sent the checking notification.

On the other hand, when the held information coordination unit A106 of the communication terminal A1a (node 1) receives a list of candidates to be deleted (at the correspondent communication terminal) from the correspondent other communication terminal A1b (node 2), the held information coordination unit A106 determines, on the basis of the combination of the received list of candidates to be deleted (at the correspondent communication terminal) and the stored list of candidates to be deleted (at the local communication terminal), whether or not information is invalid, and immediately deletes information determined to be invalid to avoid uselessly holding or sets 'Time Out' or an 'invalid-entry flag' indicating that the information is invalid in the node information storage unit A102 or the routing information storage unit A104 to leave the deletion of the invalid information to the node information exchange control unit A101 or the routing information exchange control unit A103 as described previously with respect to sequence Seq13 in FIG. 8.

An example of the operation of the held information coordination unit A106 of the communication terminal A1a (node 1) will be further described with reference to the flowchart of FIG. 9. Note that in the following description, the operation will be described in which the held information coordination unit A106 of the communication terminal A1a (node 1) uses only the information in the communication terminal A1a (node 1) to determine whether information is information to be held by the communication terminal A1a (node 1) or invalid information that does not need to be held and to be deleted, and immediately deletes a node information entry or routing information entry that is determined to be invalid information that does not need to be held and to be deleted from the node information storage unit A102 or the routing information storage unit A104 as described previously.

In the second embodiment, in order to check for invalid information that does not need to be held at predetermined regular intervals as described above, the held information coordination unit A106 of the communication terminal A1a (node 1) is activated to determine whether or not a node information entry that corresponds to a routing information stored in the routing information storage unit A104 exists in the node information storage unit A102, or routing information entry that corresponds to a node information stored in the node information storage unit A102 exists in the routing information storage unit A104, or whether or not an existing corresponding information entry has expired (step S200).

In the example illustrated in the diagram of FIG. 8, the expiration date and time 13 of the node information entry N110y in the node information storage unit A102 that relates to the communication terminal Y (node Y) with the same node IP address 12 as the destination IP address 41 (Dest. IP address) '192.168.0.3' of the routing information entry R110y in the routing information R110 stored in the routing information storage unit A104 is 'Time Out', indicating expiration. Accordingly, it is determined that the routing information entry R110y that has a destination IP address (Dest. IP address) 41 of '192.168.0.3' and corresponds to the node information entry N110y relating to the communication terminal Y (node Y) is invalid information that does not need to be held, and the routing information entry R110y is placed on the list of candidates to be deleted and stored.

The checking operation described above is performed for all of the node information entries stored in the node information storage unit A102 and all of the routing information entries stored in the routing information storage unit A104 and, when checking as to whether or not corresponding entries exist and whether or not entries have expired has been completed and a list of candidates to be deleted has been generated, the process proceeds to step S201.

Upon proceeding to step S201, the held information coordination unit A106 references the list of candidates to be deleted which has been generated at step S200 to identify a node information entry or routing information entry that does not have a corresponding information entry or an existing corresponding node information entry or routing information entry that has expired as invalid information that does not need to be held and deletes the information from the node information storage unit A102 or the routing information storage unit A104 (step S201). For example, in the diagram of FIG. 8, the routing information entry R110y (the routing information entry with a destination IP address 41 (Dest. IP address) of '192.168.0.3') corresponding to the node information entry N110y relating to the communication terminal Y (node Y) that has expired is deleted. Note that the held information coordination unit A106 may set 'Time Out' or an "invalid-entry flag' in the expiration date and time 43 of the routing information entry R110y at this point and may leave deletion of the routing information entry R110y to the routing information exchange control unit A103, instead of immediately deleting the routing information entry R110y.

By performing the operation described in the flowchart of FIG. 9, each communication terminal (each node) can "reduce the transfer information amount of node information and routing information exchanged with another communication terminal". Specifically, each communication terminal (each node) periodically discriminates between routing information, for example, to be held and invalid routing information that does not need to be held, deletes routing information determined to be invalid routing information that does not need to be held, and thus can avoid exchanging useless information with another communication terminal.

Consequently, when neighboring communication terminals (for example the communication terminal A1a (node 1) and another communication terminal A1b (node 2) illustrated in FIG. 8) periodically exchange routing information with each other, the communication terminals can exchange valid routing information alone, excluding routing information entries whose corresponding node information entries have expired and which cannot be used in information sharing, thereby avoiding useless information exchange. Note that while exchange of routing information between communication terminals has been described here, the same operation is performed for exchanging node information. Furthermore, when corresponding information is checked, expiration of a node information entry is considered to be equivalent to absence of the entry as noted above. In the case of a routing information entries, not only a routing information entry that has expired but also a routing information entry whose route score is less than or equal to a predetermined threshold value is considered to be equivalent to a missing entry as noted above.

(Configuration of Third Embodiment)

Figure 10:
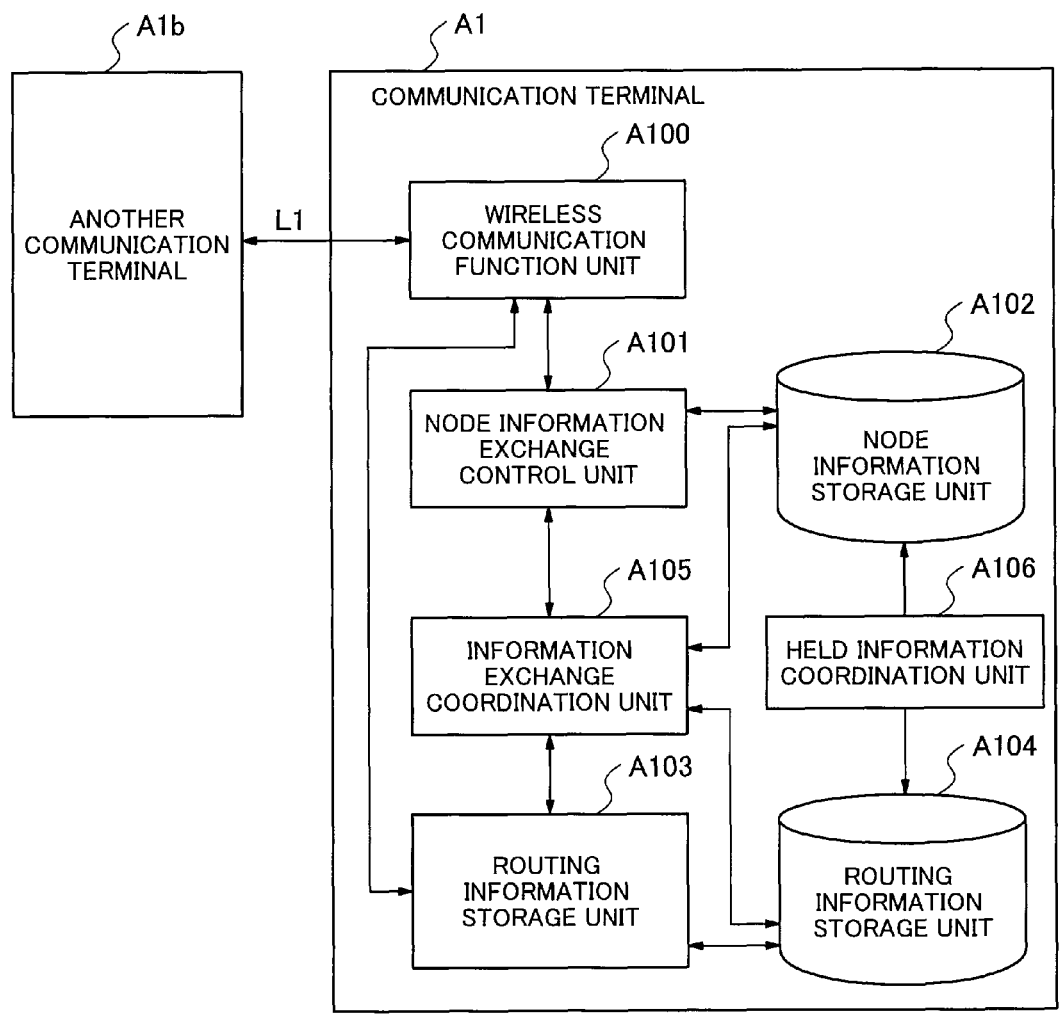
FIG. 10 is a block diagram illustrating an exemplary block configuration of a third embodiment of a communication terminal according to the present invention.

A third embodiment of the present invention will be described next in detail with reference to block diagram of FIG. 10. FIG. 10 is a block diagram illustrating an exemplary block configuration of the third embodiment of a communication terminal according to the present invention.

In the communication terminal A1 in FIG. 1 described previously as the first embodiment, node information or routing information is exchanged on the basis of whether or not corresponding information entries between node information and routing information exist to acquire both of the node information and routing information at substantially the same time and information in the node information storage unit A102 and information in the routing information storage unit A104 are updated. In the communication terminal A1 in FIG. 7 described previously as the second embodiment, determination is made as to whether or not a node information entry or a routing information entry is to be held by the communication terminal A1 on the basis of whether or not corresponding information entries between node information and routing information exist and, if it is determined that the information entry is not to be held, the information entry is deleted from the node information storage unit A102 or the routing information storage unit A 104.

The communication terminal A1 of the third embodiment illustrated in FIG. 10 is characterized by having the capability of performing the operation of the first embodiment and the operation of the second embodiment in combination.

Accordingly, the communication terminal A1 of the third embodiment illustrated in FIG. 10 includes both of the information exchange coordination unit A105 of the communication terminal A1 of the first embodiment illustrated in FIG. 1 and the held information coordination unit A106 of the communication terminal A1 of the second embodiment illustrated in FIG. 7. The functions of the information exchange coordination unit A105 and the held information coordination unit A106 are the same as the functions described in the first embodiment and the second embodiment, respectively, and the repeated description of those functions will be omitted here.

(Description of Operation of Third Embodiment)

An example of an operation in which the communication terminal A1 illustrated in FIG. 10 as a third embodiment performs control to acquire both of node information and routing information at substantially the same time and an example of an operation in which the communication terminal A1 performs control to avoid uselessly holding only one of a pair of a node information entry and a routing information entry will be described next in detail with reference to the diagram of FIG. 5, the flowchart of FIG. 6, the diagram of FIG. 8 and the flowchart of FIG. 9 described previously.

Operation of the communication terminal A1 of the third embodiment illustrated in FIG. 10 will be described first with reference to the diagram of FIG. 5. Like the communication terminal A1a (node 1) illustrated in the diagram of FIG. 5 as the first embodiment, the communication terminal A1 illustrated in FIG. 10 uses an information exchange coordination unit A105 to monitor node information and routing information at predetermined regular intervals to determine the timings of exchanging node information and routing information. Specifically, upon detecting update of only one of a pair of a node information entry and a routing information entry that correspond to each other, the information exchange coordination unit A105 immediately performs an operation for acquiring the corresponding other information entry from a neighboring other communication terminal A1*b* to control to acquire both of the node information entry and the routing information entry that correspond to each other at substantially the same time and update the node information and the routing information, as illustrated in the diagram of FIG. 5 and the flowchart of FIG. 6 as the first embodiment.

Furthermore, like the communication terminal A1*a* (node 1) illustrated in the diagram of FIG. 8 as the second embodiment, the communication terminal A1 illustrated in FIG. 10 uses a held information coordination unit A106 to check node information entries and routing information entries that correspond with each other at predetermined regular intervals to determine whether an information entry is an information entry to be held or an invalid information entry that does not need to be held.

Specifically, as illustrated in the diagram of FIG. 8 and the flowchart of FIG. 9 as the second embodiment, when the held information coordination unit A106 uses only information in the local communication terminal to determine whether or not an information entry is to be held, the held information coordination unit A106 checks node information entries and routing information entries that are stored in the communication terminal and correspond to each other and, if a corresponding information entry does not exist or an existing corresponding information entry has expired, the held information coordination unit A106 determines that the information entry is an invalid information entry that does not need to be held and deletes the information entry from the node information storage unit A102 or the routing information entry A104.

Furthermore, as described with respect to the diagram of FIG. 8, when the held information coordination unit A106 also uses information in other communication terminals to determine whether or not an information entry is to be held, the held information coordination unit A106 exchange a notification of checking node information and routing information with all neighboring other communication terminals. Upon receipt of the checking notification, the held information coordination unit A106 extracts an information entry that does not have a corresponding information entry at the local communication terminal or an information entry that has expired as an invalid information entry that does not need to be held, places the information entry on a list of candidates to be deleted (at the local communication terminal), stores the list, and sends the list of candidates to be deleted (at the local communication terminal) as a list of candidates to be deleted (at a correspondent communication terminal) back to the other communication terminal that has sent the checking notification.

Moreover, upon receipt of a list of candidates to be deleted (at the correspondent communication terminal) from the correspondent other communication terminal to which the checking notification has been sent, the held information coordination unit A106 uses the combination of the received list of candidates to be deleted (at the correspondent communication terminal) and the stored list of candidates to be deleted (at the local communication terminal) to identify an invalid information entry that does not need to be held and deletes the information entry from the node information storage unit A102 or the routing information storage unit A104.

In the communication terminal of the third embodiment that performs the operation described above, the provision of both of the information exchange coordination unit A105 and the held information coordination unit A106 not only enables the communication terminal to be placed in a "state where both of node information and routing information are managed in association with each other or a state where both of the two kinds of information are held" but also enables "reduction in the transfer information amount of node information and routing information exchanged with other communication terminals".

Configurations of preferred embodiments of the present invention have been described. However, it should be noted that the embodiments are illustrative of the present invention and are not intended to limit the present invention. It will be understood by those skilled in the art that various variations and modification can be made for adaptation to specific applications without departing from the scope of the present invention.

This application is based upon and claims the benefit of priority of Japanese Patent Application No. 2012-224131, filed on Oct. 9, 2012, the entire disclosure of which is incorporated herein.

[Reference Signs List]
11 . . . Node ID
12 . . . Node IP address
13 . . . Entry expiration date and time
21 . . . Node ID
22 . . . Routing Address
23 . . . Entry expiration date and time
31 . . . Node ID
32 . . . Node IP address
33 . . . Contents list
34 . . . Entry expiration date and time
41 . . . Destination IP address
42 . . . Next-hop IP address
43 . . . Entry expiration date and time
51 . . . Destination IP address
52 . . . Next-hop IP address
53 . . . Entry receipt time
61 . . . Destination IP address
62 . . . Next-hop IP address
63 . . . Route score
A1 . . . Communication terminal
A100 . . . Wireless communication function unit
A101 . . . Node information exchange control unit
A102 . . . Node information storage unit
A103 . . . Routing information exchange control unit
A104 . . . Routing information storage unit
A105 . . . Information exchange coordination unit
A106 . . . Held information coordination unit
A1*a* . . . Node 1 (local communication terminal)
A1*b* . . . Node 2 (other communication terminal)
B1 . . . Communication terminal
L1 . . .Wireless communication link
N100 . . . Node information held by node A
N100y . . . Entry of node Y in node information held by node A
N110 . . . Node information held by node 1
N110y . . . Entry of node Y in node information held by node 1
N120, N130 . . . Node information
P1 . . . Node information non-holding period
P2 . . . Routing information non-holding period
R100 . . . Routing information held by node A
R100y . . . Entry of node Y in routing information held by node A
R110 . . . Routing information held by node 1
R110y . . . Entry of node Y in routing information held by node 1
R120, R130 . . . Routing information
S100-S103 . . . Process steps at information exchange coordination unit of first embodiment S200, S201 . . . Process steps at held information coordination unit of second embodiment T1, T2 . . . Messaging timing

The invention claimed is:

1. A method for exchanging information between communication terminals, the method comprising:
- exchanging node information and routing information between a plurality of communication terminals constituting a network;
- identifying each of the communication terminals using the node information; and
- indicating, using the routing information, a communication route to each of the communication terminals which is a destination;
- wherein when each of the plurality of communication terminals detects, in the routing information locally held by the communication terminal, update of a routing information entry relating to any of the communication terminals or detects, in the node information locally held by the communication terminal, update of a node information entry relating to any of the communication terminal,
- the communication terminal references, in the node information locally held by the communication terminal, a node information entry corresponding to the updated routing information entry or, references, in the routing information locally held by the communication terminal, a routing information entry corresponding to the updated node information entry; and
- if the corresponding node information entry or the corresponding routing information entry does not exist, acquires the corresponding node information entry or the corresponding routing information entry from another communication terminal.

2. The method for exchanging information between communication terminals according to claim 1,
- wherein cases where a node information entry corresponding to the routing information entry does not exist includes at least a case where an amount of time greater than or equal to a period of time predetermined as an expiration date and time of the node information entry has passed; and
- cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

3. A method for exchanging information between communication terminals, the method comprising:
- exchanging node information and routing information between a plurality of communication terminals constituting a network;
- identifying each of the communication terminals using the node information; and
- indicating, using the routing information, a communication route to each of the communication terminals which is a destination;
- wherein when each of the plurality of communication terminals determines whether or not each of the routing information entries relating to the communication terminals that are included in the routing information locally held by the communication terminal or each of the node information entries relating to the communication terminals that are included in the node information locally held by the communication terminal is information to be held,
- the communication terminal references, in the node information locally held by the communication terminal, a node information entry corresponding to each of the routing information entries or references, in the routing information locally held by the communication terminal, a routing information entry corresponding to each of the node information entries; and
- if a node information entry corresponding to the routing information entry does not exist, the communication terminal deletes the relevant routing information entry from the routing information locally held by the communication terminal, or if a routing information entry corresponding to the node information entry does not exist, the communication terminal deletes the relevant node information entry from the node information locally held by the communication terminal.

4. The method for exchanging information between communication terminals according to claim 3,
- wherein cases where a node information entry corresponding to the routing information entry does not exist includes at least a case where an amount of time greater than or equal to a period of time predetermined as an expiration date and time of the node information entry has passed; and
- cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

5. The method for exchanging information between communication terminals according to claim 3,
- wherein cases where a node information entry corresponding to the routing information entry does not exist includes at least a case where an amount of time greater than or equal to a period of time predetermined as an expiration date and time of the node information entry has passed; and
- cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

6. A method for exchanging information between communication terminals, the method comprising:
- exchanging node information and routing information between a plurality of communication terminals constituting a network;
- identifying each of the communication terminals using the node information; and
- indicating, using the routing information, a communication route to each of the communication terminals which is a destination;
- wherein when each of the plurality of communication terminals determines whether or not each of the routing information entries relating to the communication terminals that are included in the routing information locally held by the communication terminal or each of the node information entries relating to the communication terminals that are included in the node information locally held by the communication terminal is information to be held, the communication terminal references, in the node information locally held by the communication terminal, a node information entry corresponding to each of the routing information entries or references, in the routing information locally held by the communication terminal, a routing information entry corresponding to each of the node information entries; and if a node information entry corresponding to the routing information entry does not exist, the communication terminal places the relevant routing information entry on an own list of candidates to be deleted at the communication terminal, stores the own list of candidates to be deleted at the communication terminal, and sends the own list of candidates to be deleted at the communication terminal to another communication terminal as a list of candidates to be deleted at a correspondent communication terminal, or if a routing information entry corresponding to each of the node information entries does not exist, places the relevant node information entry on an own list of candidates to be deleted at the communication terminal, stores the own list of candidates to be deleted at the communication terminal, and sends the own list of candidates to be deleted at the communication terminal to another communication terminal as a list of candidates to be deleted at a correspondent communication terminal;

when the communication terminal receives the list of candidates to be deleted at the correspondent communication terminal from another communication terminal, the communication terminal determines, on the basis of a combination of the routing information entry or the node information entry placed on the received list of candidates to be deleted at the correspondent communication terminal and the routing information entry or the node information entry placed on the stored own list of candidates to be deleted at the communication terminal, whether or not each of the routing information entries locally held by the communication terminal is to be kept held or whether or not each of the node information entries locally held by the communication terminal is to be kept held; and the communication terminal deletes the routing information entry determined to be invalid information that does not need to be kept held from the routing information locally held by the communication terminal, or deletes the node information entry determined to be invalid information that does not need to be kept held from the node information held locally by the communication terminal.

7. The method for exchanging information between communication terminals according to claim 6, wherein each of the plurality of communication terminals determines that the routing information entry that is placed on all of the lists of candidates to be deleted at the correspondent communication terminal and the own list of candidates to be deleted at the communication terminal, or the routing information entry that is placed on at least one of the lists of candidates to be deleted at the correspondent communication terminal and the own list of candidates to be deleted at the communication terminal is an invalid routing information entry that does not need to be kept held; or each of the plurality of communication terminals determines that the node information entry placed on all of the lists of candidates to be deleted at the correspondent communication terminal and the own list of candidates to be deleted at the communication terminal, or the node information entry placed on at least one of the lists of candidates to be deleted at the correspondent communication terminal and the own list of candidates to be deleted at the communication terminal is an invalid node information entry that does not need to be kept held.

8. The method for exchanging information between communication terminals according to claim 7, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

9. The method for exchanging information between communication terminals according to claim 7, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

10. The method for exchanging information between communication terminals according to claim 6, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

11. The method for exchanging information between communication terminals according to claim 6, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

12. A communication terminal which exchanges node information and routing information with one or more other communication terminals constituting a network, the node information being used for identifying each of a plurality of communication terminals, the routing information indicating a communication route to each of communication terminals which is a destination, the communication terminal comprising:

upon detection of update of a routing information entry relating to any of the communication terminals in the routing information held by the communication terminal or update of a node information entry relating to any of the communication terminals in the node information held by the communication terminal, referencing unit that references, in the node information held by the communication terminal, a node information entry corresponding to the updated routing information entry or, references, in the routing information held by the communication terminal, a routing information entry corresponding to the updated node information entry upon detection of update of a routing information entry relating to any of the communication terminals in the routing information held by the communication terminal or update of a node information entry relating to any of the communication terminals in the node information held by the communication terminal; and acquiring unit that acquires the corresponding node information entry or the corresponding routing information entry from another communication terminal if the corresponding node information entry or the corresponding routing information entry does not exist.

13. The communication terminal according to claim 12, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

14. A communication terminal which exchanges node information and routing information with one or more other communication terminals constituting a network, the node information being used for identifying each of a plurality of communication terminals, the routing information indicating a communication route to each of communication terminals which is a destination, the communication terminal comprising:

referencing unit that references, in the node information locally held by the communication terminal, a node information entry corresponding to each of the routing information entries or references, in the routing information locally held by the communication terminal, a routing information entry corresponding to each of the node information entries when determining whether or not each of the routing information entries relating to the communication terminals that are included in the routing information held by the communication terminal or each of the node information entries relating to the communication terminals that are included in the node information held by the communication terminal is information to be held; and deleting unit that deletes the relevant routing information entry from the routing information locally held by the communication terminal if a node information entry corresponding to the routing information entry does not exist, or deletes the relevant node information entry from the node information locally held by the communication terminal if a routing information entry corresponding to the node information entry does not exist.

15. The communication terminal according to claim 14, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

16. The communication terminal according to claim 14, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

17. A communication terminal which exchanges node information and routing information with one or more other communication terminals constituting a network, the node information being used for identifying each of a plurality of communication terminals, the routing information indicating a communication route to each of communication terminals which is a destination, the communication terminal comprising:

a referencing unit that references, in the node information held by the communication terminal, a node information entry corresponding to each of the routing information entries or references, in the routing information held by the communication terminal, a routing information entry corresponding to each of the node information entries when determining whether or not each of the routing information entries relating to the communication terminals that are included in the routing information held by the communication terminal or each of the node information entries relating to the communication terminals that are included in the node information held by the communication terminal is information to be held; and a held information coordination unit that places the relevant routing information entry on an own list of candidates to be deleted at the communication terminal, stores the own list of candidates to be deleted at the communication terminal, and sends the own list of candidates to be deleted at the communication terminal to another communication terminal as a list of candidates to be deleted at a correspondent communication terminal if a node information entry corresponding to the routing information entry does not exist, or places the relevant node information entry on an own list of candidates to be deleted at the communication terminal, stores the own list of candidates to be deleted at the communication terminal, and sends the own list of candidates to be deleted at the communication terminal to another communication terminal as a list of candidates to be deleted at a correspondent communication terminal if a routing information entry corresponding to each of the node information entries does not exist;

a determining unit that determines, on the basis of a combination of the routing information entry or the node information entry placed on the received list of candidates to be deleted at the correspondent communication terminal and the routing information entry or the node information entry placed on the stored own list of candidates to be deleted at the communication terminal, whether or not each of the routing information entries held by the communication terminal is to be kept held or whether or not each of the node information entries held by the communication terminal is to be kept held when the communication terminal receives the list of candidates to be deleted at the correspondent communication terminal from another communication terminal; and a deleting unit that deletes the routing information entry determined to be invalid information that does not need to be kept held from the routing information held by the communication terminal, or deletes the node information entry determined to be invalid information that does not need to be kept held from the node information held by the communication terminal.

18. The communication terminal according to claim 17, wherein the communication terminal determines that the routing information entry that is placed on all of the lists of candidates to be deleted at the correspondent communication terminal and the own list of candidates to be deleted at the communication terminal, or the routing information entry that is placed on at least one of the lists of candidates to be deleted at the correspondent communication terminal and the own list of candidates to be deleted at the communication terminal is an invalid routing information entry that does not need to be kept held; or the communication terminal determines that the node information entry placed on all of the lists of candidates to be deleted at the correspondent communication terminal and the own list of candidates to be deleted at the communication terminal, or the node information entry placed on at least one of the lists of candidates to be deleted at the correspondent communication terminal and the own list of candidates to be deleted at the communication terminal is an invalid node information entry that does not need to be kept held.

19. The communication terminal according to claim 18, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

20. The communication terminal according to claim 17, wherein cases where a node information entry corresponding to the routing information entry does not exist includes at least a case where an amount of time greater than or equal to a period of time predetermined as an expiration date and time of the node information entry has passed; and cases where a routing information entry corresponding to the node information entry does not exist includes at least a case where an amount of time greater than or equal to a period of time predetermined as an expiration date and time of the routing information entry has passed or a case where a route score, which is a value indicating reachability to the communication terminal corresponding to the routing information entry, is less than or equal to a predetermined threshold value.

* * * * *